United States Patent [19]

Tomida et al.

[11] Patent Number: 5,784,462
[45] Date of Patent: Jul. 21, 1998

[54] DIGITAL SIGNAL RECEIVER CAPABLE OF RECEIVING DATA ENCRYPTED AND TRANSMITTED IN ONLINE PROCESSING

[75] Inventors: Yoshikazu Tomida; Tatsuo Hiramatsu, both of Osaka; Kazuhiro Kimura, Saitama; Shigeaki Hayashibe; Toshiyuki Ozawa, both of Gunma, all of Japan

[73] Assignee: Sanyo Electric Co., Ltd., Osaka, Japan

[21] Appl. No.: 700,773

[22] Filed: Aug. 22, 1996

[30] Foreign Application Priority Data

| Aug. 28, 1995 | [JP] | Japan | 7-218884 |
| Aug. 28, 1995 | [JP] | Japan | 7-218920 |
| Aug. 29, 1995 | [JP] | Japan | 7-220451 |
| Aug. 29, 1995 | [JP] | Japan | 7-220452 |

[51] Int. Cl.$^6$ ............................. H04L 9/08; H04L 9/00
[52] U.S. Cl. ............................. 380/21; 380/20; 380/49; 380/59; 380/9
[58] Field of Search ........................... 380/9, 20, 21, 380/49, 50, 59, 10

[56] References Cited

U.S. PATENT DOCUMENTS

| 4,771,458 | 9/1988 | Citta et al. | 380/20 |
| 4,829,569 | 5/1989 | Seth-Smith et al. | 380/20 X |
| 4,876,718 | 10/1989 | Citta et al. | 380/20 X |
| 4,890,321 | 12/1989 | Seth-Smith et al. | 380/20 |
| 4,944,006 | 7/1990 | Citta et al. | 380/20 |
| 4,995,080 | 2/1991 | Bestler et al. | 380/21 |
| 5,680,457 | 10/1997 | Bestler et al. | 380/21 |

OTHER PUBLICATIONS $^{A4-2}$FM Multiplex Broadcasting System "DARC", Takada et al., 1994 Vehicle Navigation & Information Systems Conference Proceedings, pp. 111–116.

Technical Conditions Related to Satellite Data Broadcasting, Jun. 1993, Hoso Gijutsu Kaihatsu Kyogikai, pp. 51–57.

Primary Examiner—Bernarr E. Gregory
Attorney, Agent, or Firm—Nikaido, Marmelstein, Murray & Oram LLP

[57] ABSTRACT

In a decoding processing circuit of a digital signal receiver, a first comparison circuit detects that a prefix of packet data is inputted in a shift register on the basis of a count value of a counter circuit. In response to the result of detection, a pseudo-random binary sequence generation circuit outputs a pseudo-random binary sequence on the basis of a data group number and a data packet number outputted from the shift register and key data previously extracted by a key data fetch circuit. When a second comparison circuit detects that block data in the data packet is inputted in the shift register, an exclusive OR circuit exclusively ORs the pseudo-random binary sequence with receive data, so that decoded data is inputted in the shift register.

20 Claims, 25 Drawing Sheets

FIG.4(a) PRIOR ART

| OUTPUT RS OF PSEUDO-RANDOM BINARY SEQUENCE GENERATION CIRCUIT | TRANSMIT DATA TD | ENCRYPTED TRANSMIT DATA RS⊕TD |
|---|---|---|
| 0 0 0 1 0 0 ... 1 1 0 0 | 1 0 1 0 ... 0 1 | 1 0 1 1 ... 1 0 |
| 0 0 0 1 1 0 ... 0 0 1 0 | 1 1 0 0 ... 1 0 | 1 0 0 1 ... 1 0 |
| | 1 0 1 ... 0 0 | 1 0 0 ... 1 0 |

KEY → DATA
CYCLE n

FIG.4(b) PRIOR ART

| OUTPUT RS OF PSEUDO-RANDOM BINARY SEQUENCE GENERATION CIRCUIT | ENCRYPTED RECEIVE DATA CRD | DECODED RECEIVE DATA RS⊕CRD |
|---|---|---|
| 0 0 0 1 0 0 ... 1 1 0 0 | 1 0 1 1 ... 1 0 | 1 0 1 0 ... 0 1 |
| 0 0 0 1 1 0 ... 0 0 1 0 | 1 0 0 1 ... 1 0 | 1 1 0 0 ... 1 0 |
| | 1 0 0 ... 1 0 | 1 0 1 ... 0 0 |

KEY → DATA
CYCLE n

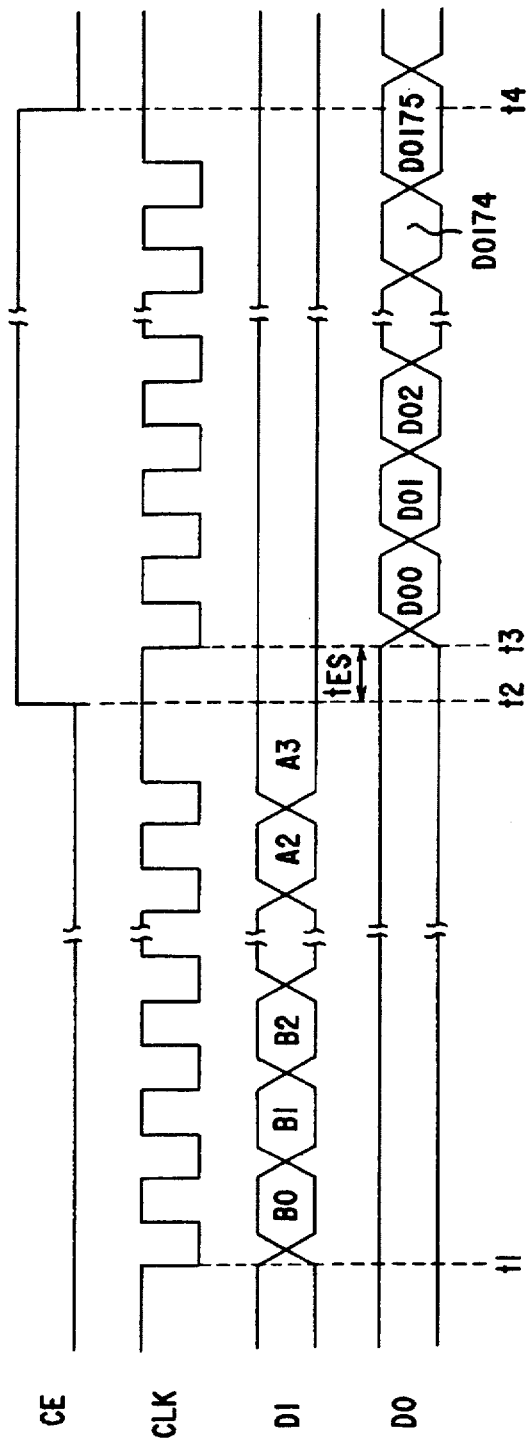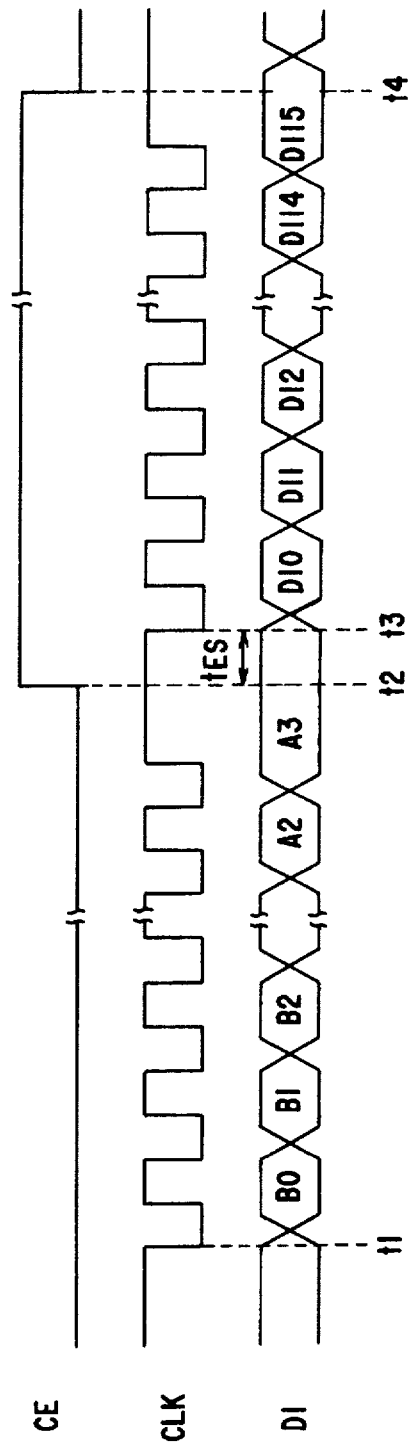
FIG.9(a) PRIOR ART
FIG.9(b) PRIOR ART

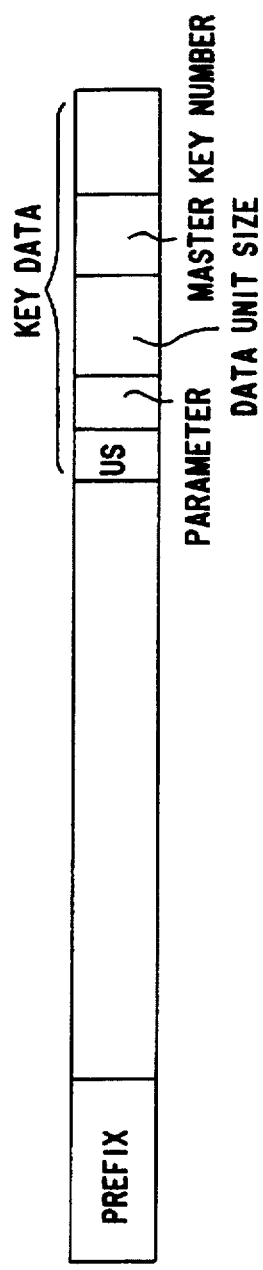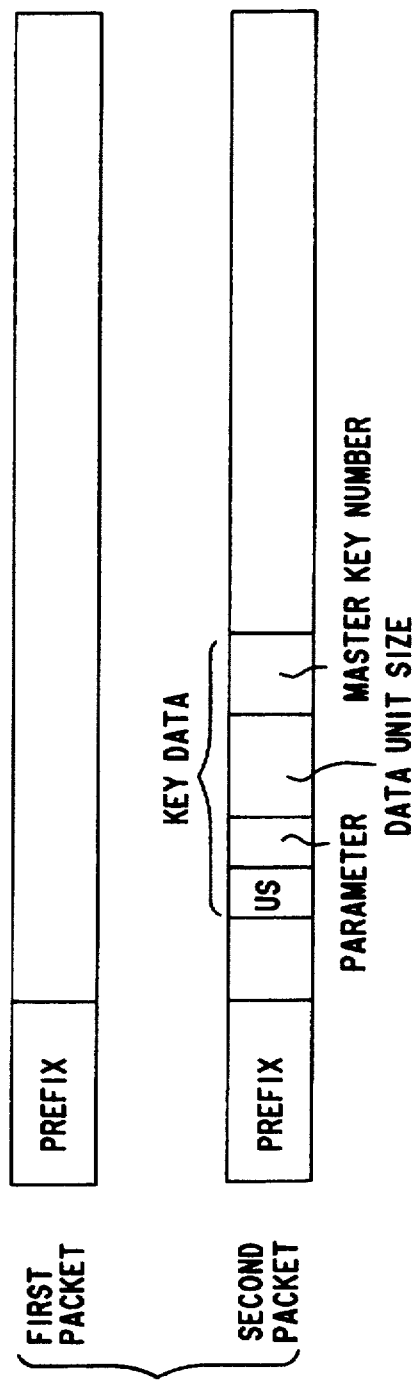
FIG. 13(a)
FIG. 13(b)

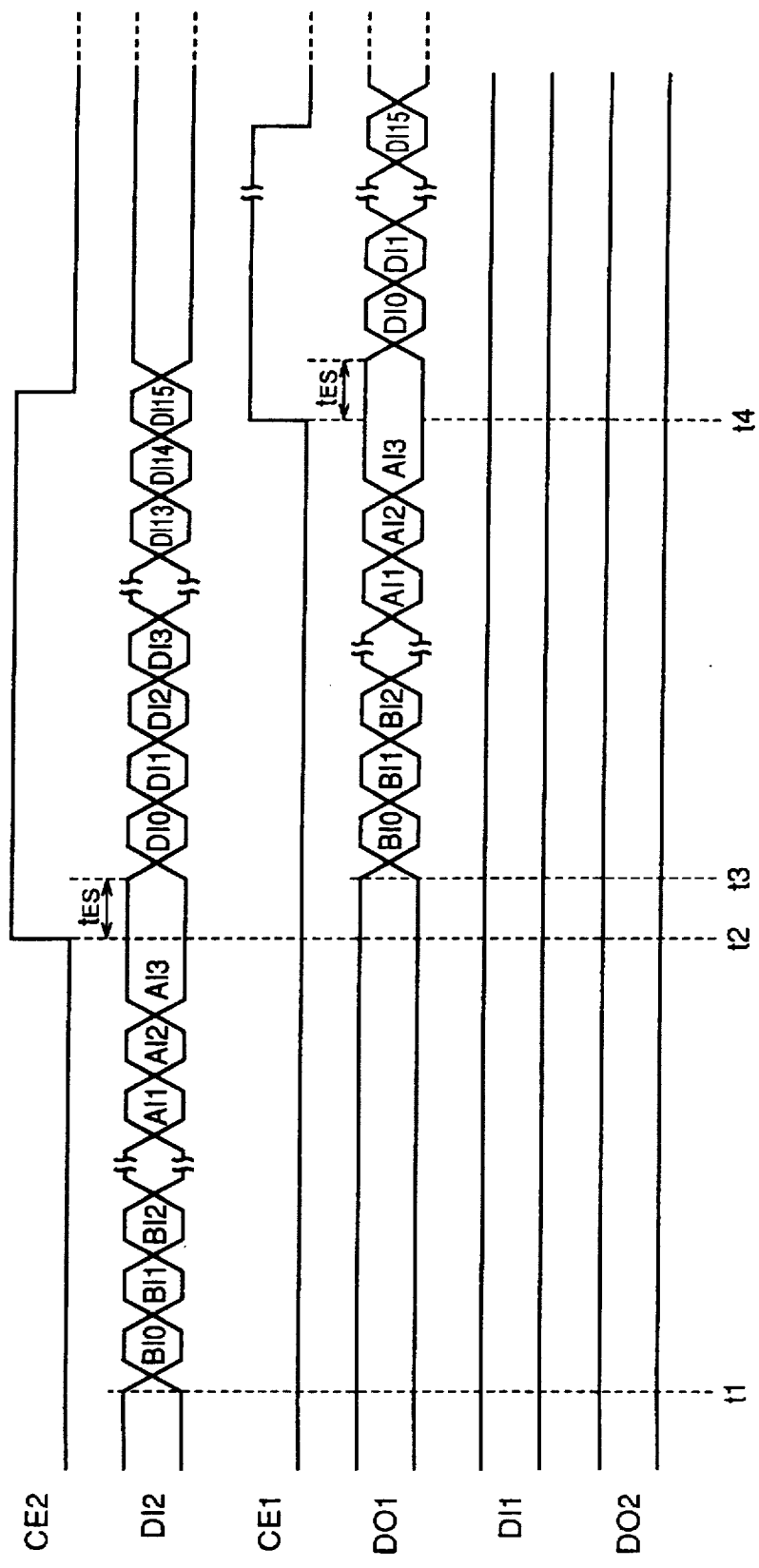

DIGITAL SIGNAL RECEIVER CAPABLE OF RECEIVING DATA ENCRYPTED AND TRANSMITTED IN ONLINE PROCESSING

BACKGROUND OF THE INVENTION

1. Field of the Invention

The present invention relates to a digital signal receiver for receiving encrypted digital signals, and more particularly, it relates to a multiplex information digital signal receiver for receiving encrypted digital signals which are transmitted through FM multiplex broadcasting.

2. Description of the Background Art

In recent years, FM multiplex broadcasting for multiplexing digital signals on free spectral areas of baseband signals of FM stereophonic broadcasting is being put into practice as broadcasting providing new services.

In particular, mobile receiving FM multiplex broadcasting is a new medium of newly multiplexing digital signals in a frequency band higher than that for sound signals of the current FM stereophonic broadcasting for providing traffic information, character/graphic information or the like to mobiles, and has the following advantages:

Frequencies can be effectively used, broadcasting equipment can be readily implemented, and data can be received by mobiles and hence traffic information can be readily transmitted to mobiles such as automobiles.

For example, a car-navigation system which is carried on an automobile or the like at present operates on the basis of fixed information recorded in a CD-ROM or the like. Thus, the driver cannot receive information on traffic congestion or the like in real time.

Therefore, the aforementioned FM multiplex broadcasting is now being put into practice as means for solving the problem of chronic traffic congestion in a big city, or the most low-priced transmission path for a mobile which can provide necessary information everywhere at any time in addition to the traffic information.

There has been proposed a method of encrypting (hereinafter referred to as "encoding") digital signals for transmitting traffic information through FM multiplex broadcasting thereby providing the information only to members as pay service.

Before explaining such an encoding method, the data structure in the FM multiplex broadcasting is now schematically described.

[System of FM Multiplex Broadcasting]

Transmission path characteristics of mobile receiving are extremely inferior in general, due to multipass interference or fading interference. Also in this case, a system which can completely receive information at one go is preferable. In a service area including a tunnel or a place subjected to strong multipass interference, however, transmitted data may not be completely receivable at one go, and the data must be supplemented by receiving retransmitted data in this case. While the service area of the FM multiplex broadcasting is preferably equivalent to that of FM stereophonic broadcasting, this service area includes a place having a mean bit error rate exceeding $10^{-2}$. In the structure of transmit data, therefore, an error correcting system and a frame structure are decided in consideration of such inferior transmission path characteristics.

The mobile receiving is remarkably influenced by fading, in addition to the multipass interference. An error resulting from extreme voltage reduction caused by fading is so critical that error correction is impossible. When s block length of transmit data is coincided with an average burst length of errors resulting from fading, it is possible to complement data by replacing the overall block with retransmitted block data if an uncorrectable error takes place.

The error correcting system employs product codes which are formed by orthogonally arranging pairs of block codes, due to a high error correcting effect. Therefore, data are in a two-dimensional frame structure including error correcting codes in both of vertical and transverse directions consisting of a plurality of blocks.

Transmit data are in a data structure having a hierarchical structure on the basis of data in one frame as a basic unit.

As a specific example of the above description, an FM multiplex broadcasting system which is disclosed in Proc. of Vehicle Navigation & Information Systems Conference (1994) A4-2, pp. 111 to 116.

FIG. 1 illustrates the specification of the aforementioned hierarchical structure.

A hierarchy 1 designates transmission path characteristics. In addition to L+R and L−R signals which are general FM stereophonic broadcasting signals, a multiplex signal is superimposed on a higher frequency side beyond the L−R signal.

In such superimposition, an LMSK (level-controlled minimum shift keying) system of controlling multiplex level by the degree of modulation of the L−R signal is employed in consideration of that interference from the multiple signal to a sound signal is remarkable when the degree of sound modulation is small.

A hierarchy 2 defines the data frame structure including the error correcting system. Each frame consists of 272 blocks, and a 16-bit BIC (block identification code) is added to the head of each block so that frame synchronization and block synchronization are performed on the basis of this BIC. Among the 272 blocks, 190 blocks form packets for transmitting data, and the remaining 82 blocks form parity packets for transmitting column-directional parity bits. The each packet is formed by a 176-bit information part, a 14-bit CRC (cyclic redundancy code) which is an error correcting code, and a 82-bit parity part.

Namely, this frame forms the basic unit of the transmit data, so that error correction is first performed in this stage.

A hierarchy 3 defines the structure of the data packet. The data packet consists of 176 bits excluding the BIC, the CRC and the parity part in each row in the frame. Further, this data packet is formed by a prefix and a data block. The prefix includes information for identifying the data content, and specifies to which program content the data packet belongs as described later, for example.

A hierarchy 4 defines the structure of a data group. The data group is formed by one or a plurality of data blocks. The data group also includes a CRC which is an error correcting code, so that error correction is performed on the transmit data also in this hierarchy.

A hierarchy 5 defines the structure of program data. A program of character/graphic information is formed by a plurality of data groups, and the head data group consists of encoded information as to the program number, the total page number and the like related to the overall program as program management data. A plurality of page data follow the program management data, and the data are encoded every page.

In the aforementioned data structure, the program data form a group of data indicating integrated information at the receiving side. In case of traffic information, for example, the program information indicates the situation of congestion at each junction of a specific route such as a speedway or the like.

[Structure of Conventional FM Multiplex Broadcasting Receiver]

FIG. 2 is a schematic block diagram showing the structure of a conventional FM multiplex broadcasting receiver 10 in case of performing no data scramble transmission.

An FM multiplex broadcasting signal which is received by an antenna 12 and a tuner 14 is detected by a detection circuit 16, and further supplied to an LMSK demodulator circuit 20 through a bandpass filter 18. The LMSK demodulator circuit 20 data-demodulates the LMSK-modulated FM multiplex broadcasting signal. The demodulated data signal is subjected to frame synchronization and block synchronization in a synchronous reproduction circuit 22 on the basis of a BIC, as described with reference to the hierarchy 2 in FIG. 1. The synchronized data signal is subjected to error correction in an error correcting circuit 24, on the basis of a parity code and a CRC.

Therefore, this error correcting circuit 24 outputs packet data, having the structure shown in the hierarchy 3 in FIG. 1, of the FM multiplex broadcasting which is correctly received or subjected to error correction.

A central processing unit (hereinafter referred to as a CPU) 40 performs extraction of a data block, reconstruction of a data group, error correction in the data group stage and reconstruction to program data on the inputted packet data, and outputs program data to a display unit 42. The display unit 42 outputs the inputted program data as graphics or characters.

The conventional FM multiplex broadcasting receiver 10 having the aforementioned structure cannot take a broadcasting system of providing information only to members as pay service through FM multiplex broadcasting.

In order to implement this broadcasting system, the FM multiplex broadcasting sending side must encode transmit data, while the receiving side must decode the data.

FIGS. 3(a) and 3(b) schematically illustrate methods of encoding transmit data and deocding encoded receive data respectively.

Referring to FIG. 3(a), a result obtained by logically operating a binary pseudo-random number which is generated by a pseudo-random binary sequence generation circuit 60 for generating an m sequence (maximum-length sequence) and transmit data by an exclusive OR circuit 62 on the basis of prescribed key data is transmitted as encoded transmit data.

Referring to FIG. 3(b), on the other hand, a result obtained by logically operating a binary pseudo-random number generated by a pseudo-random binary sequence generation circuit 60 on the basis of the prescribed key data employed for encoding in the transmission system and the encoded receive data in an exclusive OR circuit 62 is outputted as decoded receive data on the side receiving the encoded transmit data.

The features of these scrambling and descrambling methods reside in the following points:

First, the same key data is employed on the sending and receiving sides.

Second each pseudo-random binary sequence generation circuit 60 necessarily outputs a prescribed binary pseudo-random number (e.g., an m sequence) on the basis of the same key data.

Third, binary transmit data returns to the original value when subjected to an exclusive OR operation with the same binary pseudo-random data twice.

FIGS. 4(a) and 4(b) illustrate operations in case of encoding and decoding transmit data by the aforementioned encoding and decoding methods respectively.

FIG. 4(a) illustrates an operation of encoding transmit data TD, and FIG. 4(b) illustrates an operation of decoding encoded receive data CRD respectively.

It is assumed that an output RS of the pseudo-random binary sequence generation circuit 60 is an m sequence which is changed in a cycle n. Referring to FIGS. 4(a) and 4(b), it is assumed that all data are 4-bit data, for simplifying the illustration.

Referring to FIG. 4(a), the exclusive OR of the signal RS and the transmit data TD is 1011 in case of scrambling the transmit data TD of 1010 with key data of 0001, for example. This signal is transmitted as encoded transmit data. Similarly, the next transmit data TD of 1101 is exclusively ORed with an output 0100 of the pseudo-random binary sequence generation circuit 60, so that encoded transmit data 1001 is transmitted. The signal RS is changed in the cycle n, and exclusive ORs of the transmit data TD and the signal RS are successively transmitted as encoded transmit data.

Referring to FIG. 4(b), on the other hand, the pseudo-random binary sequence generation circuit 60 outputs a signal RS forming an m sequence also on the receiving side, on the basis of the same key data 0001 as the sending side. In this case, a binary sequence which is absolutely identical to that on the sending side is outputted as the signal RS in the cycle n when based on the same key data.

A signal sequence obtained by successively exclusively ORing the signal RS and encrypted receive data CRD is shown on the right column of FIG. 4(b). Namely, each encoded receive data CRD is obtained by exclusively ORing each transmit data TD with the same signal RS twice. It is understood that this value matches with the transmit data TD by a simple calculation.

The encoding and decoding methods for digital signals expressed in binary numbers have been described in an extremely simplified manner.

In order to encode data transmitted through FM multiplex broadcasting in the aforementioned manner, it is mainly necessary to solve the following problems:

i) What structure is to be employed for the key data:

In the above description, the sending side encodes the transmit data and the receiving side decodes the receive data on the basis of single key data (hereinafter referred to as master key data). In order to improve safety of the encoding system, it is preferable not to employ the master key data as initial data for generating the m sequence signal RS as such but to employ a value obtained by a prescribed logical operation, for example.

ii) How to structure a system for encoding and decoding:

The encoding and decoding methods can be basically performed in the system shown in FIGS. 3(a) and 3(b). In order to put these transmission and receiving systems into effect, however, it is necessary to implement structures of a transmitter and a receiver suitable for the data structure of the transmitted data and the like.

iii) How to deliver the master key data:

In the encoding and decoding methods described with reference to FIGS. 3(a) and 3(b), the same key data is employed in the transmission and receiving systems for encoding and decoding the signal. In order to keep safety so that the encoded transmit data is not readily decoded, it is effective to update the encoded key data employed for generating the m sequence signal RS with time. In this case, it is effective to transmit the data through radio waves in order to enable updating in a short time. In more specific terms, the transmit data must be transmitted through a data channel.

As to a data encoding method in a digital signal transmission/receiving system, a specific encoding or decoding method is disclosed in "Technical Conditions related to Satellite Data Broadcasting", issued by Hoso Gijutsu Kaihatsu Kyogikai on June 1993, pp. 51 to 57, for example, in relation to satellite broadcasting.

FIGS. 5 to 7 show this method. In encoding or decoding of satellite broadcasting, an initial value for a PN signal generation circuit initial value register shown in FIG. 5 is set on the basis of encoded key data a0 to a31 transmitted through a data channel. The value of the initial value register is logically operated with data CI, LCI1, LCI2 etc. transmitted every packet in an initial value correcting circuit shown in FIG. 6, so that corrected values are inputted in a pseudo-random binary sequence generation circuit (PRBS generation circuit) shown in FIG. 7 as corrected initial values c0 to c31. The PRBS generation circuit is formed by the so-called feedback registers, so that the corrected initial values c0 to c31 define the initial values of the feedback registers of the PRBS generation circuit.

However, the aforementioned encoding method of satellite broadcasting depends on the data structure in the satellite broadcasting, and is not applicable to FM multiplex broadcasting, for example, since the data packet structure of satellite data broadcasting is different from that of FM multiplex data broadcasting.

If a structure of enabling data decoding on the receiving side can be implemented by adding a decoding processing circuit in a conventional FM multiplex broadcasting receiver or simply adding a decoding processor to the FM multiplex broadcasting receiver without essentially changing the structure of the conventional FM multiplex broadcasting receiver, this is effective also in consideration of the cost for manufacturing the receiver.

In more specific terms, it is necessary to attain a structure capable of decoding data by adding a decoding processing circuit or a decoding processor between the error correcting circuit 24 and the CPU 40 in the structure of the conventional FM multiplex broadcasting receiver 10 shown in FIG. 2.

If such a decoding processing circuit or a decoding processor is merely connected between the error correcting circuit 24 and the CPU 40, however, the following problem arises:

FIG. 8 is a timing chart showing data input/output timings of the error correcting circuit 24 and the CPU 40 in the conventional FM multiplex broadcasting receiver 10 shown in FIG. 2.

At a time t1, the error correcting circuit 24 outputs a pulse interruption signal INTR of a high level indicating that receiving of data corresponding to a single packet is completed to the CPU 40.

At a time t2, the CPU 40 outputs an external clock signal Ext.CLK in response to activation (high level) of the interruption signal INTR.

The error correcting circuit 24 receives the external clock signal Ext.CLK, and outputs receive data bitwise every pulse of the clock signal. When the CPU 40 outputs clock pulses for a single packet, i.e., for 176 bits, therefore, input/output of packet data from the error correcting circuit 24 to the CPU 40 is completed.

If a decoding processing circuit or a decoding processor is connected between the error correcting circuit 24 and the CPU 40, therefore, this results in a delay by the decoding processing time. If the cycle of the clock signal Ext.CLK outputted from the CPU 40 is increased in order to cope with this, for example, the data processing time is disadvantageously increased.

If a decoding processing circuit or a decoding processor is merely connected between the error correcting circuit 24 and the CPU 40, further, the following problem also arises:

FIGS. 9(a) and 9(b) are timing charts showing data input/output timings of the error correcting circuit 24 and the CPU 40 in more detail, in case of outputting demodulated data from the error correcting circuit 24 to the CPU 40 and in case of outputting control data from the CPU 40 to an FM multiplex broadcasting demodulation LSI including the error correcting circuit 24 respectively.

First, the case of outputting demodulated data from the error correcting circuit 24 to the CPU 40 (serial data output mode) is now described.

Referring to FIG. 9(a), the CPU 40 starts to output address signals B0 to B3 and A0 to A3 to the error correcting circuit 24 along with a clock signal CLK at a time t1. At a time t2, the CPU 40 converts a signal CE from a low level to a high level, in order to indicate that address signals are completely outputted.

The error correcting circuit 24 receives the address signals B0 to B3 and A0 to A3, detects that the operation enters the serial data output mode, and successively outputs demodulated data DO0 to DO175 (corresponding to data for a single packet) bitwise in response to the clock signal CLK outputted from the CPU 40 at a time t3 after a lapse of a time $t_{ES}$ from the time t2.

As shown in FIG. 8, the time 1 when the CPU 40 starts to output the address signals B0 to B3 and A0 to A3 along with the clock signal CLK is decided in response to the interruption signal INTR which is outputted by the error correcting circuit 24 for indicating that preparation for data output for a single packet is completed.

The timing in case of outputting the control data DI0 to DI15 from the CPU 40 to the error correcting circuit 24 is now described.

Referring to FIG. 9(b), the CPU 40 starts to output the address signals B0 to B3 and A0 to A3 to the error correcting circuit 24 along with the clock signal CLK at a time t1.

At a time t2, the CPU 40 converts a signal CE from a low level to a high level, in order to indicate that the address signals are completely outputted. The error correcting circuit 24 detects that the address signals are completely outputted in response to the signal CE which is inverted to a high level, and detects that the operation enters the serial data input mode by the values of the address signals B0 to B3 and A0 to A3.

At a time t3 after a lapse of a time $t_{ES}$ from the time t2, the CPU 40 outputs the control data DI0 to DI15 to the error correcting circuit 24 along with the clock signal CLK.

At a time t4, the signal CE is converted to a low level in response to that the control data DI15 is completely outputted.

In the FM multiplex broadcasting demodulation LSI including the error correcting circuit 24, a mode, parameters etc. in case of performing error correction, for example, are set in response to the control data DI0 to DI15.

If an intermediate processor performing decoding processing or the like is connected between the error correcting circuit 24 and the CPU 40, therefore, this results in a delay by a time necessary for the decoding processing or the like. If the cycle of the clock signal CLK outputted from the CPU 40 is increased in order to cope with this, for example, the data processing time is disadvantageously increased also in this case.

If a decoding processor or the like is added, further, the data input/output interface is unpreferably changed in view of user-friendliness of the intermediate processor.

SUMMARY OF THE INVENTION

Accordingly, a principal object of the present invention is to provide a digital signal receiver having an encoding system with high safety for information concealability.

Another object of the present invention is to provide a digital signal receiver which can extract master key data transmitted through a data channel.

Still another object of the present invention is to provide a digital signal receiver having an optimum structure for the data structure of FM multiplex broadcasting to be capable of high-speed operations.

A further object of the present invention is to provide a digital signal receiver having a decoding processing circuit which can be additionally applied to the structure of a conventional FM multiplex broadcasting receiver as such.

A further object of the present invention is to provide a digital signal receiver having a decoding processing circuit which is applicable as such without changing a conventional interface structure and capable of performing high-speed operations.

Briefly stated, the present invention is directed to a digital signal receiver for receiving transmit data, in a communication system for transmitting the transmit data comprising of a plurality of packets each having a second prescribed bit length, each packet including information data of a first prescribed bit length which is divided into a plurality of blocks so that each packet includes a plurality of specific data indicating the attributes of the packet and encrypted information data in first and second areas respectively, and this digital signal receiver comprises a demodulator circuit, a key data fetch circuit, a decoding processing circuit, and a data operation circuit.

The demodulator circuit receives the transmitted transmit data, and decodes the same to a corresponding digital signal.

The key data fetch circuit receives an output of the demodulator circuit, and extracts master key data from a prescribed one of the plurality of packets including the information data.

The decoding processing circuit performs decoding processing on the information data for every corresponding packet on the basis of at least one of the specific data included in every packet and the master key data.

The data operation circuit receives an output of the decoding processing circuit, extracts the divided information data from the plurality of packets, and forms and outputs the same as the information data.

In a preferred embodiment of the digital signal receiver according to the present invention, the key data fetch circuit comprises a receive data storage circuit, a key data position detection circuit, and a key data extract circuit. The receive data storage circuit successively serially receives and serially outputs receive data, and outputs storage data in parallel. The key data position detection circuit detects whether or not the receive data is encoded for every packet for activating an encoding detection signal if the receive data is encoded, and detects the position of the storage data in the receive data storage circuit in the receive data for activating a first bit position detection signal. The key data extract circuit fetches first storage data including key data from the receive data storage circuit in parallel, in response to the activation of the encoding detection signal and the first bit position detection signal.

Preferably, the storage capacity of the receive data storage circuit is smaller than the second prescribed bit length.

In another preferred embodiment of the digital signal receiver according to the present invention, the key data fetch circuit comprises a receive data storage circuit, a key data position detection circuit, and a key data extract circuit. The receive data storage circuit successively serially receives and serially outputs receive data, and outputs storage data in parallel. The key data position detection circuit detects whether or not the receive data is encoded for every packet for activating an encoded detection signal if the receive data is encoded, and outputs key data packet indicating data extracted from a prescribed packet, as well as a packet number indicating signal and an in-packet position indicating signal corresponding to a packet number and an in-packet position to which the storage data in the receive data storage circuit belongs respectively. The key data extract circuit receives the encoding detection signal, the key data packet indicating data, the packet number indicating signal and the in-packet position indicating signal, and receives first storage data including key data outputted from the receive data storage circuit in parallel in response to a comparison result of the key data packet indicating data and the packet number indicating signal and that of previously stored key data position data specified in response to the key data packet indicating data and the in-packet position indicating signal.

In still another preferred embodiment of the digital signal receiver according to the present invention, the decoding processing circuit comprises a receive data storage circuit, a decoding signal generation circuit, and a logical operation circuit. The receive data storage circuit successively serially receives and serially outputs receive data, and outputs storage data in parallel. The decoded signal generation circuit detects that the first area is inputted in the receive data storage circuit for every packet, and generates a decoding signal on the basis of specific data included in the storage data outputted in parallel. The logical operation circuit receives the receive data and the decoding signal, and performs decoding processing of information data in the second area for every corresponding packet.

Preferably, the storage capacity of the receive data storage circuit is smaller than the second prescribed bit length.

According to a further preferred embodiment of the digital signal receiver according to the present invention, the demodulator circuit and the data operation circuit are controlled by an operation control clock signal which is generated in response to activation of a first trigger signal from the demodulator circuit side for transmitting/receiving digital data, while the decoding processing circuit includes a data processing circuit, an internal clock generation circuit, and a clock signal output circuit.

The data processing circuit, whose digital data input operation is controlled by the operation control clock signal, performs initial value decision processing on the basis of the digital data from the demodulator circuit, and performs decoding processing on the basis of the decided initial value for outputting the data to the data operation circuit side. The internal clock generation circuit outputs an internal clock signal. The clock signal output circuit outputs the internal clock signal as the operation control clock signal in a period when the digital data from the demodulator circuit is inputted by a prescribed number of bits in response to activation of the first trigger signal, and outputs a second trigger signal responsive to the first trigger signal to the data operation circuit side after a lapse of the initial value decision processing period for receiving the external clock signal outputted from the data operation circuit side in response to activation of the second trigger signal and outputting the same as the operation control clock signal in a decoding processing period.

Accordingly, a principal advantage of the present invention resides in that information data encoded with different key data for every packet forming the information transmission unit can be received.

Another advantage of the present invention resides in that decoding processing can be performed by receiving master key data transmitted through a data channel, thereby enabling data transmission with high concealability.

Still another advantage of the present invention resides in that the digital signal receiver has the optimum structure for the FM multiplex broadcasting data structure, and can perform high-speed operations.

A further advantage of the present invention resides in that the digital signal receiver can be directly applied to a conventional FM multiplex broadcasting receiver as such.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 illustrates operation principles of a conventional data scramble system.

FIG. 4 illustrates operations of the conventional data encoding system, FIGS. 4(a) and 4(b) show operations of encoding and decoding transmission data, respectively;

FIG. 9 is timing chart of data input/output timings in the conventional FM multiplex broadcasting receiver, FIGS. 9(a) and 9(b) show operations in serial data output and input modes respectively;

FIG. 12 is data arrangement diagram.

FIG. 13 is data arrangement diagram, FIGS. 13(a) and 13(b) show in-packet positions of key data in FM multiplex broadcasting in the program data structures A and B respectively;

FIG. 31 is a timing chart showing the operation of the decoding processing circuit 800 according to the fourth embodiment of the present invention in a serial data input mode.

DESCRIPTION OF THE PREFERRED EMBODIMENTS

[First Embodiment]

Figure 10:
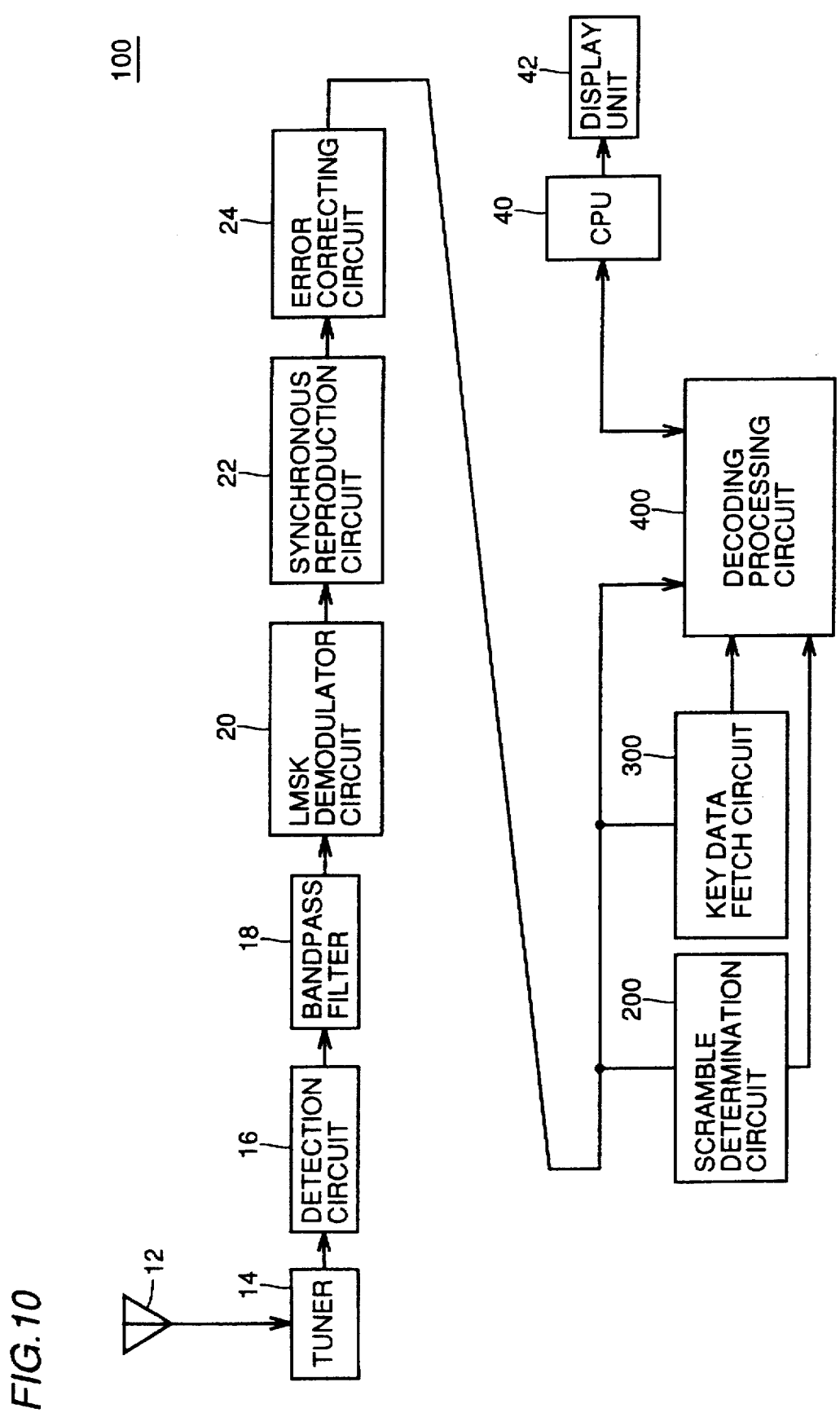
FIG. 10 is a schematic block diagram showing the structure of an FM multiplex broadcasting receiver according to a first embodiment of the present invention.

FIG. 10 is a schematic block diagram showing the structure of an FM multiplex broadcasting receiver 100 according to a first embodiment of the present invention.

Figure 2:
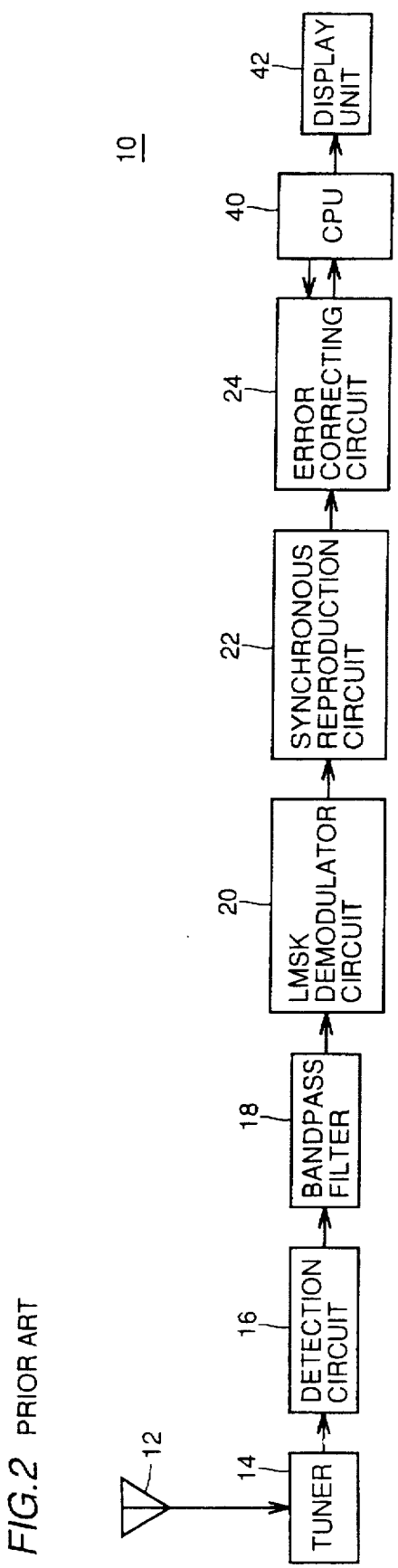
FIG. 2 is a block diagram showing the structure of a conventional FM multiplex broadcasting receiver.

The structure of this embodiment is different from that of the conventional FM multiplex broadcasting receiver 10 shown in FIG. 2 in a point that the multiplex broadcasting receiver 100 includes an encoding determination circuit 200 for receiving packet data outputted from an error correcting circuit 24 and detecting whether or not each packet data is encoded for activating an encoding detection signal if the packet data is scrambled, a key data fetch circuit 300 for receiving the packet data and fetching key data included in the receive data, and a decoding processing circuit 400 for extracting a data group number and a data packet number from each packet data for descrambling information data included in the packet data on the basis of these data and the key data from the key data fetch circuit 300.

The remaining portions which are identical to those of the prior art are denoted by the same reference numerals, to omit redundant description.

Similarly to the conventional FM multiplex broadcasting receiver 10 shown in FIG. 2, an FM multiplex broadcasting signal received by an antenna 12 and a tuner 14 is detected by a detection circuit 16, and further supplied to an LMSK demodulator circuit 20 through a bandpass filter 18. The LMSK demodulator circuit 20 demodulates a data signal superimposed on the FM multiplex broadcasting signal, and supplies the demodulated data signal to the error correcting circuit 24 through a synchronous reproduction circuit 22. The error correcting circuit 24 outputs packet data of FM multiplex broadcasting correctly received or subjected to error correction.

The decoding processing circuit 400 fetches a data group number to which each packet data belongs and a data packet number of this packet data in the data group, for example, and decodes encoded information data included in the packet data on the basis of the data group number and the data packet number.

In this case, the decoding processing may alternatively be performed not on the basis of the data group number and the data packet number alone, but on the basis of the data group number, the data packet number and the key data extracted by the key data fetch circuit 300.

In this case, it is assumed that the key data is included in a specific data packet among those belonging to the same data group, for example, in the packet data outputted from the error correcting circuit 24.

Due to the aforementioned structure, this embodiment has the following advantage, as compared with the structure of decoding packet data belonging to the same data group by a pseudo-random binary sequence generated on the basis of single key data extracted by the key data fetch circuit 300:

If the packet data is decoded by the same pseudorandom binary sequence for every packet, increased is such a possibility that the data is decoded through this property. When the system of changing the initial value for generating the pseudo-random binary sequence for every packet is employed, therefore, the encoded information data is harder to decode and concealability of the transmit data is improved.

The decoded receive data outputted from the decoding processing circuit 400 is inputted in a CPU 40, and reconstructed into program data, similarly to the conventional FM multiplex broadcasting receiver 10.

A display unit 42 outputs the inputted program data as graphics or characters.

Due to the aforementioned structure, only a user having the FM multiplex broadcasting receiver 100 of the inventive structure can decode and read the encoded; data when the received packet data is encoded, and a user having the conventional FM multiplex broadcasting receiver 10 cannot read the content of the scrambled transmit data.

Figure 11:
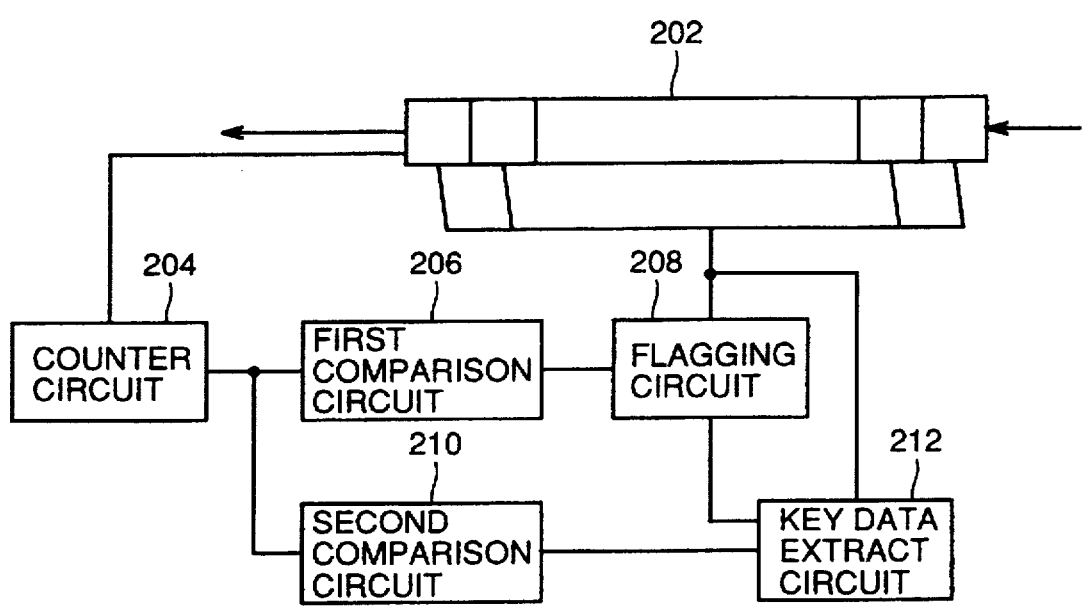
FIG. 11 is a schematic block diagram showing the structure of a key data fetch circuit 300 in the first embodiment.

FIG. 11 is a schematic block diagram showing the structure of the key data fetch circuit 300 according to the first embodiment.

Before explaining the structure and the operation of the key data fetch circuit 300, the data structure of transmitted data and the position of key data in each received data are now described with reference to FIGS. 12(a) to 13(b).

Figure 1:
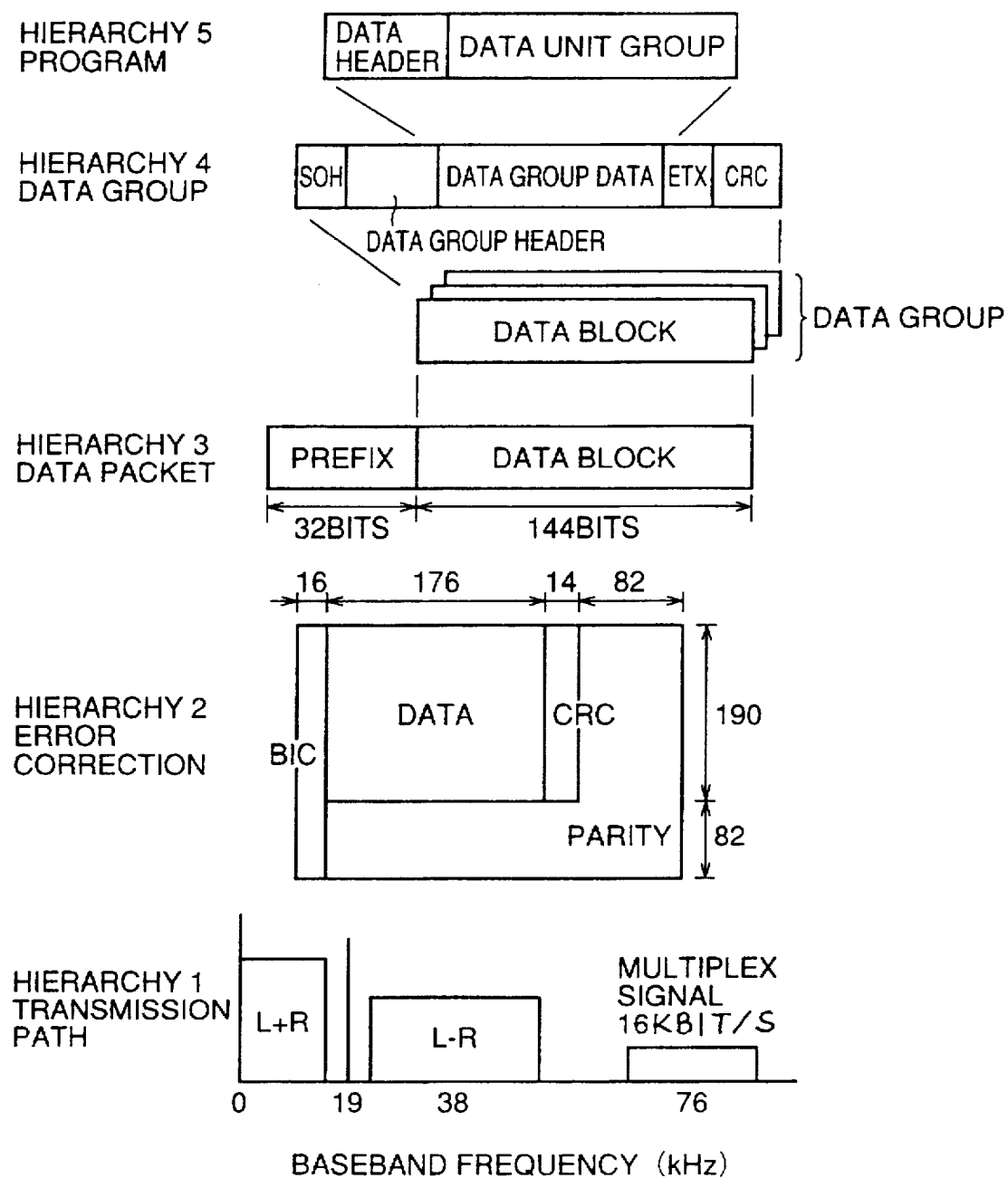
FIG. 1 is a block diagram showing a data hierarchical structure in FM multiplex broadcasting.

As shown in the hierarchy 5 in FIG. 1, the program data is finally structured by a data header and a following data unit group. The length of a data block which can be transmitted by a single data packet is 144 bits (18 bytes), and hence actual FM multiplex broadcasting generally has the following two cases depending on the length of data header:

In the first case, the data header is entirely stored in the first packet. In the second case, on the other hand, the data header extends to the second packet.

Figures 12A, 12B:
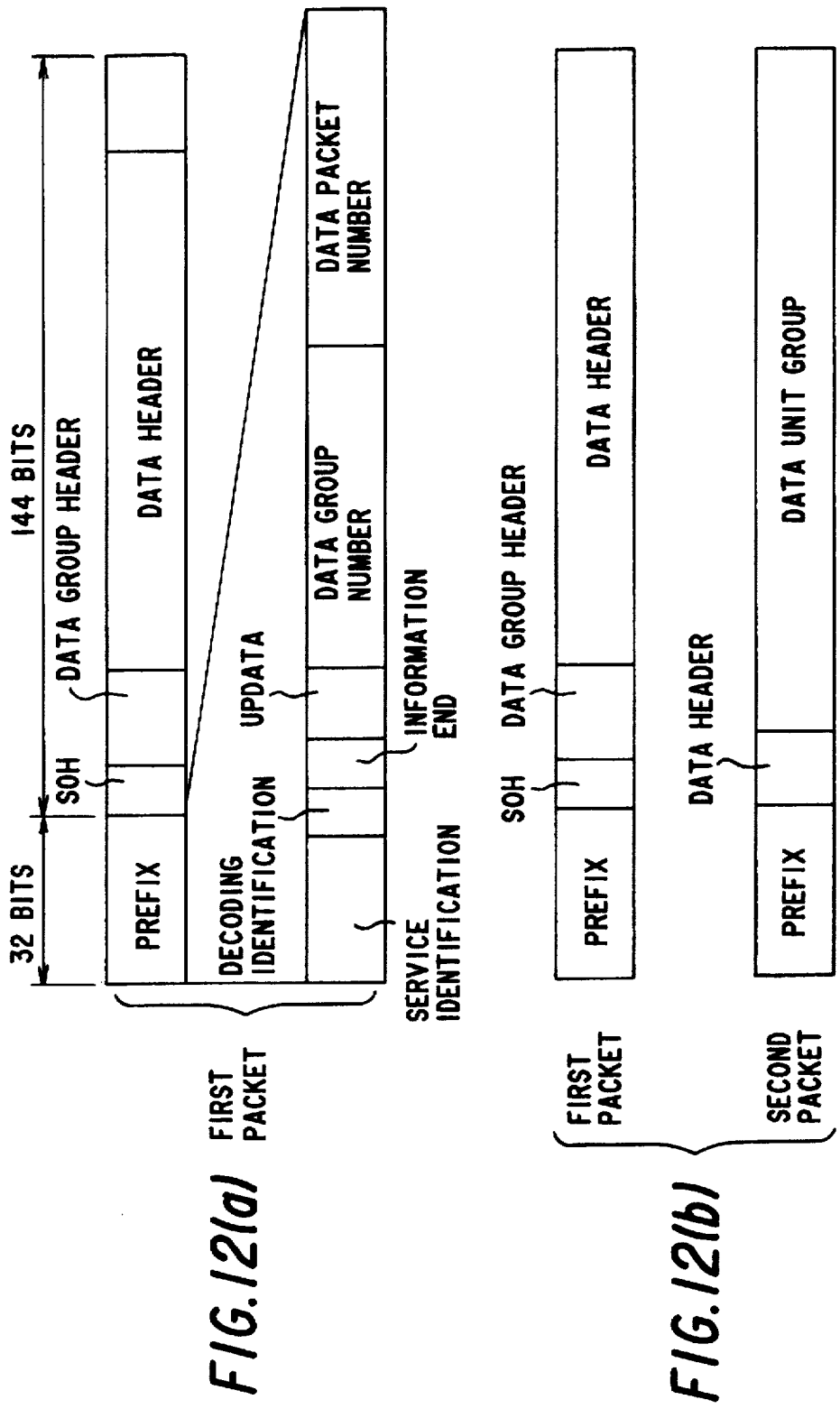
FIG. 12(a) and 12(b) show program data header structures A and B in FM multiplex broadcasting respectively.

FIGS. 12(a) and 12(b) illustrate the first and second cases respectively.

In either case, a 32-bit prefix is present at the head of each packet data. This prefix includes a service identification code, a data group number, a data packet number and the like. A determination is made as to whether or not a series of data groups are related to encoding through the data, such as the service identification code, for example, included in the prefix.

An actual data area follows the prefix. In the first packet, a start of heading code (SOH) (1 byte), a data group header (2 bytes) and the data header follow the prefix in this order.

There are various types of data headers, and the following data lengths can be present, for example: A data header for a program data header structure A has a data length of 6 bytes, and that of a program data header structure B has a data length of 11 bytes. On the other hand, a data header of a page data header structure A has a data length of 7 bytes, and that of a page data header structure B has a data length of 16 bytes.

The data which can be transmitted in a single packet has a length of 18 bytes as described above, and hence the data header extends to the first byte, excluding a prefix part, of the second packet in case of the page data header structure B.

Also when key data is included immediately at the back of the data header in case of transmitting scramble key data, therefore, the following two cases are generally conceivable depending on the structures of the data headers:

In the first case, the key data is included in the first packet as shown in FIG. 13(a). In the second case, on the other hand, and the key data is included in the second packet as shown in FIG. 13(b).

In the aforementioned program or page data header structure A, a data unit separator (US), a data unit parameter, a data unit size, and encoding key data are successively transmitted from the 11th byte of the data block of the first packet. The data unit separator and the data unit parameter indicate that scramble key data is included in the following data, and the data unit size indicates the data length of the area including the encoding key data, i.e., from the start of the data unit separator up to the end of the encoding key data.

In case of the program or data header structure B, on the other hand, the data area including the key data cannot be entirely stored in the first packet and hence a series of data including key data from a data unit separator to encoding key data are transmitted from the second byte of the second packet, for example.

Referring again to FIG. 11, the key data fetch circuit 300 according to the first embodiment of the present invention corresponds to such a case that the encoding key data is fixed to a data structure of being included in the second byte (excluding the prefix part) of the second packet.

In the following description, it is assumed that a data packet is encoded if the service identification code in the prefix is any of 4, 5 and 6, and the data encoding is performed only for the data block.

Referring to FIG. 11, the key data fetch circuit 300 includes a shift register 202, a counter circuit 204, a first comparison circuit 206, a flagging circuit 208, a second comparison circuit 210, and a key data extract circuit 212.

The shift register 202 is not particularly restricted but formed by a 40-bit shift register, for example, which successively receives packet data outputted from the error correcting circuit 24.

The counter circuit 204 indicates the in-packet bit number of the newest single bit in the shift register 202. It is assumed that the counter circuit 204 performs a counting operation in a cycle of the data length of a single packet, i.e., 176 bits in this case.

The first comparison circuit 206 outputs a high-level signal to the flagging circuit 208 at a point when the value of the counter circuit 204 reaches 32, i.e., when whole prefix in the packet data is inputted in the shift register 202.

The flagging circuit 208 fetches the data packet number and the service identification code from the prefix in the shift register 202 in response to a timing when an output of the first comparison circuit 206 goes high. The output of the flagging circuit 208 goes high if the data packet number is 1 (corresponding to the second packet) and the service identification code is any of 4, 5 and 6, or goes low in other cases.

The second comparison circuit 210 receives an output of the counter 204, and outputs a high-level signal if the count value is 80. It is assumed that the data length of the area from the data unit separator to the end of the scramble key data, which is a data area including the key data, is 5 bytes (40 bits) in this case. Therefore, the count value of the counter circuit 204 reaches 80 when the second one of the data packets belonging to the scrambled data group is inputted in the shift register 202 and the head of the data area provided with the key data, i.e., the data unit separator comes to the head of the shift register 202.

In this case, it is assumed that the data unit separator US is a hexadecimal numeral 1F, and the data unit parameter is 50 in hexadecimal, for example, if the following data area includes the key data.

When the output of the flagging circuit 208 is at a high level and the data stored in the shift register 202 are hexadecimal numbers 1F and 50 in order from the head, therefore, the key data extract circuit 212 fetches the key data from the shift register 202 at a timing when an output signal from the second comparison circuit 210 goes high.

The shift register 202, the counter circuit 204 and the like essentially operate in response to a clock signal which is supplied from a clock circuit (not shown in FIG. 11).

Figure 14:
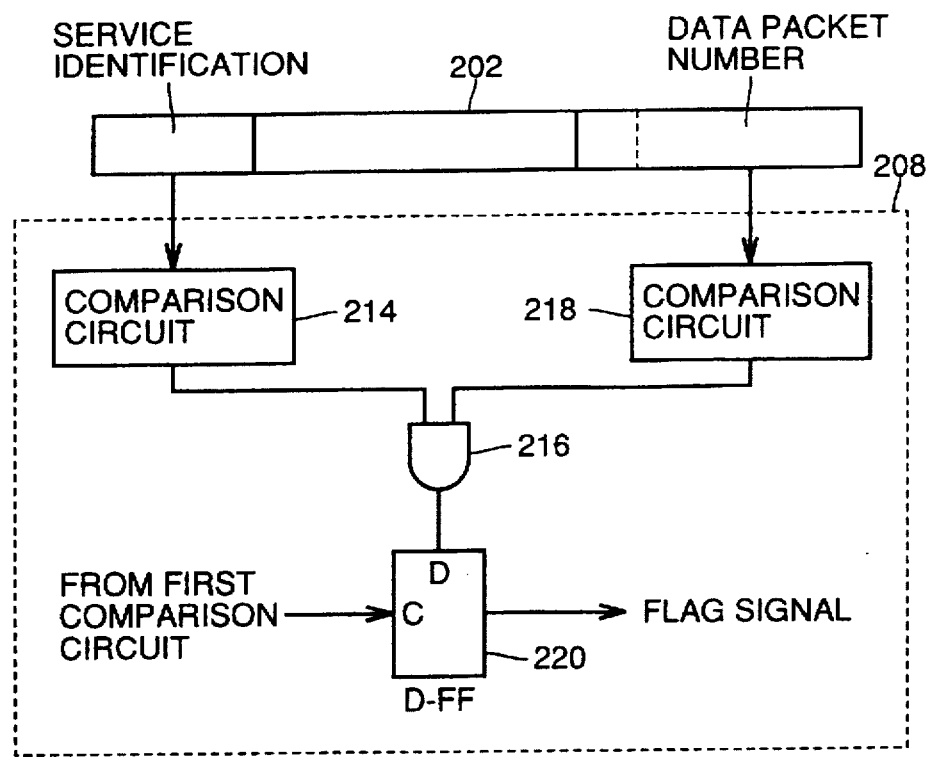
FIG. 14 is a schematic block diagram showing the structure of a flagging circuit 208 of the key data fetch circuit 300 according to the first embodiment of the present invention.

FIG. 14 is a schematic block diagram showing the structure of the flagging circuit 208.

The flagging circuit 208 includes a comparison circuit 214 for receiving parallel outputs of a prescribed number of bits from the head of the shift register 202, a comparison circuit 218 for receiving parallel outputs of a prescribed number of bits from the least significant bit of the shift register 202, an AND circuit 216 for receiving outputs from the comparison circuits 214 and 218, and a D flip-flop circuit 220 for receiving outputs of the first comparison circuit 206 and the AND circuit 216 as a clock and an input respectively thereby outputting a flag signal.

The comparison circuit 214 compares the parallel outputs of the prescribed number of bits from the head of the shift register 202 with the value of the service identification code, i.e., any of 4, 5 and 6 in this embodiment, in relation to scrambled data and converts its output signal to a high level if coincidence is determined.

The comparison circuit 218 receives the parallel outputs of the prescribed number of bits from the least significant bit of the shift register 202 and compares the packet number of the data packet with a numerical value 1 when the prefix of the data packet is inputted in the shift register 202, and output a high-level signal if coincidence is determined.

Therefore, the AND circuit 216 outputs a high-level signal when the data packet whose prefix is inputted in the shift register 202 is scrambled and this is the second packet (the data packet number is 1).

Thus, the flag signal outputted from the D flip-flop circuit 220 for latching the output signal of the AND circuit 216 also goes high in response to the high level of the output signal from the first comparison circuit 206, when the data packet whose prefix is inputted in the shift register 202 is encoded and this is the second packet.

Figure 15:
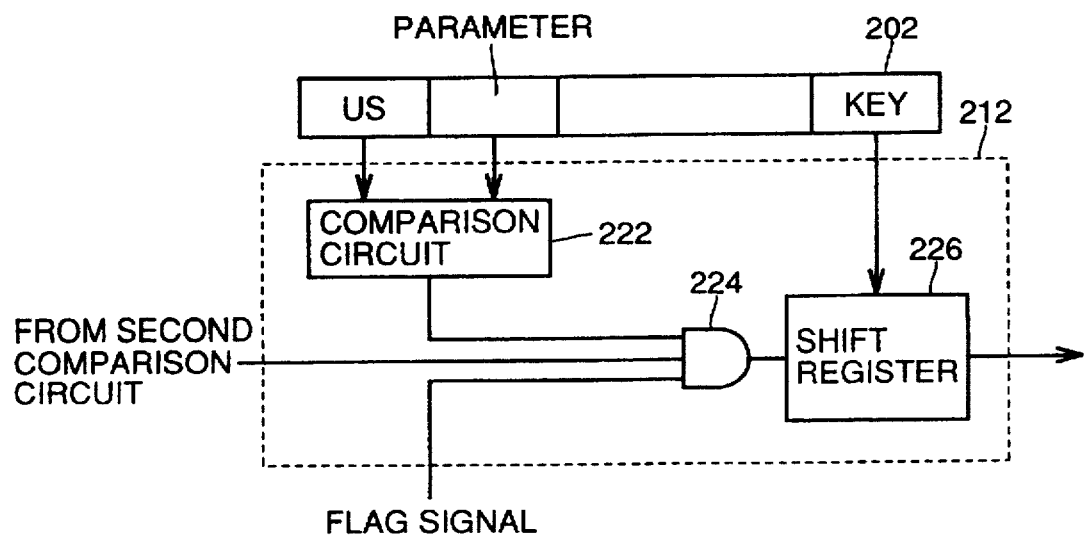
FIG. 15 is a schematic block diagram showing the structure of a key data extract circuit 212 in the key data fetch circuit 300.

FIG. 15 is a schematic block diagram showing the structure of the key data extract circuit 212.

The key data extract circuit 212 includes a comparison circuit 222 for receiving parallel outputs of a prescribed number of bits from the head of the shift register 202, an AND circuit 224 for receiving outputs of the comparison circuit 222, the second comparison circuit 210 and the flagging circuit 208, and a shift register 226 for receiving an output signal of the AND circuit 224 as a clock signal and receiving the parallel outputs of the prescribed number of bits from the least significant bit of the shift register 202 in response to inversion of this clock signal to a high level.

The comparison circuit 222 compares data of two bytes at the head of the shift register 202 with the hexadecimal data 1F and 50, and outputs a high-level signal if coincidence is determined. The AND circuit 224 outputs a high-level signal when all outputs of the flagging circuit 208, the second comparison circuit 210 and the comparison circuit 222 go high. Namely, the output of the AND circuit 224 goes high when the following conditions are satisfied: The packet data currently inputted in the shift register 202 is encoded, this packet data is the second packet, the output of the flagging circuit 208 is at a high level, the second byte of the data block of the data packet, i.e., the data area to which the key data belongs, is inputted in the shift register 202, and the data inputted in the shift register 202 includes the key data.

The shift register 226 receives key data outputted in parallel in a prescribed number of bits from the least significant bit of the shift register 202 in response to the inversion of output of the AND circuit 224 to a high level.

Due to the aforementioned structure, the key data fetch circuit 300 can fetch the encoding key data when the position of the key data is fixed to be included in a prescribed position of the second packet, for example.

Further, the aforementioned structure can be formed with storage capacity of not more than that for a single packet (22 bytes) of the transmit data for the shift register, whereby the stage number of the shift register can be reduced and a data delay of receive data passing therethrough can be minimized.

[Second Embodiment]

With reference to the first embodiment, the exemplary structure of the key data fetch circuit 300 in relation to key data whose position is fixed among scrambled transmit data. As hereinabove described, however, the key data may not necessarily be included in a prescribed position of the second packet, depending on the structure of the transmitted data. In this case, the key data fetch circuit must switch the key data fetch position in response to the data structure of the receive data.

Figure 16:
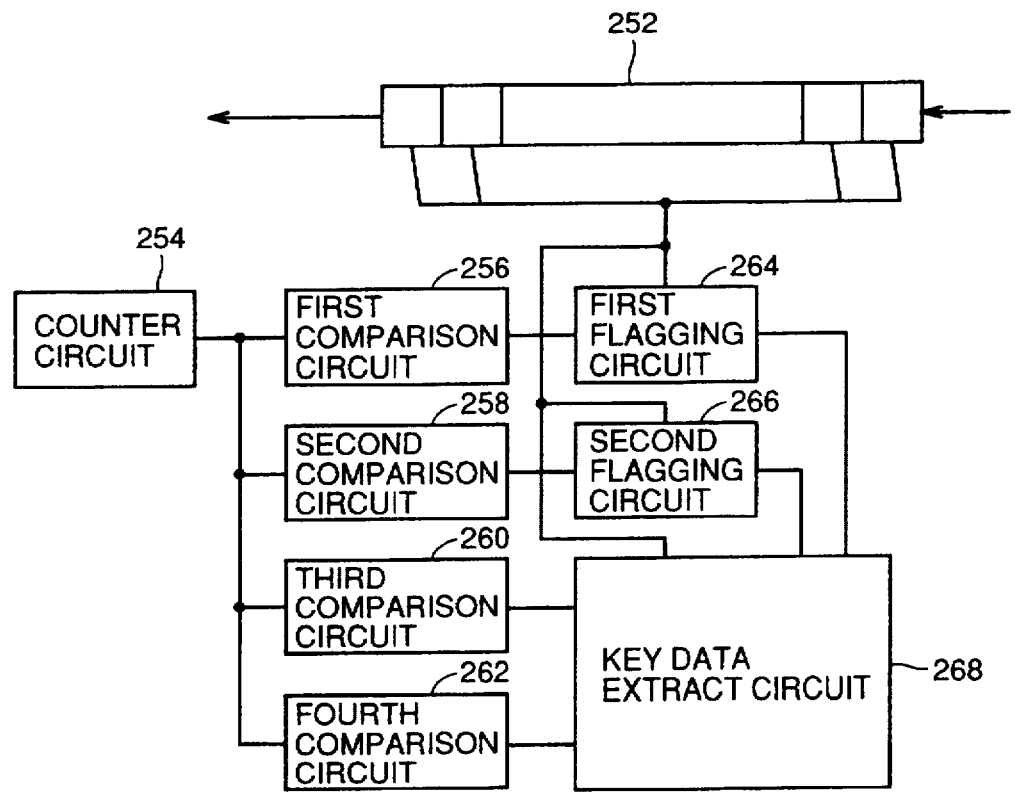
FIG. 16 is a schematic block diagram showing the structure of a key data fetch circuit 350 according to a second embodiment of the present invention.

FIG. 16 is a schematic block diagram showing the structure of a key data fetch circuit 350, corresponding to the key data fetch circuit 300 in the circuit structure of the receiver shown in FIG. 10, according to a second embodiment of the present invention.

According to this embodiment, it is assumed that encoding key data is transmitted from the 11th byte of a first packet if transmitted data is in a program or page data header structure A, or from the second byte of a second packet if the transmitted data is in a program or page data header structure B. Further, it is assumed that a data block following a prefix is scrambled if a service identification code in the prefix is any of 4, 5 and 6, similarly to the first embodiment.

The key data fetch circuit 350 includes a shift register 252 successively receiving outputs from the error correction circuit 24 shown in FIG. 10, a counter circuit 254 for counting the bit number of the data inputted in the shift register 252 in a cycle of 176 bits, a first comparison circuit 256 for outputting a high-level signal to a first flagging circuit 264 when the count value of the counter circuit 254 reaches a value corresponding to such a case that a prefix is inputted in the shift register 252, the first flagging circuit 264 for receiving parallel outputs from the shift register 252 in response to an output of the first comparison circuit 256 for determining whether or not data in a data block following the prefix is encoded and fetching a data packet number to which the prefix belongs, a second comparison circuit 256 for outputting a high-level signal to a second flagging circuit 266 when the count value of the counter circuit 254 reaches a value corresponding to such a case that a data header is inputted in the shift register 252, a third comparison circuit 262 for receiving the count value of the counter circuit 254 and detecting that a data area to which key data belongs is inputted in the shift register 252 when the data header is in the program or page data header structure A, a fourth comparison circuit 262 for receiving the count value of the counter circuit 254 and detecting that the data area to which the key data belongs is inputted in the shift register 252 when the data is in the program or page data header structure B, and a key data extract circuit 268 for receiving outputs of the first and second flagging circuits 264 and 266 and the third and fourth comparison circuits 260 and 262 and extracting the key data from the shift register 252.

The operation of the key data fetch circuit 350 is now described with reference to flow charts shown in FIGS. 20 and 21.

Figure 20:
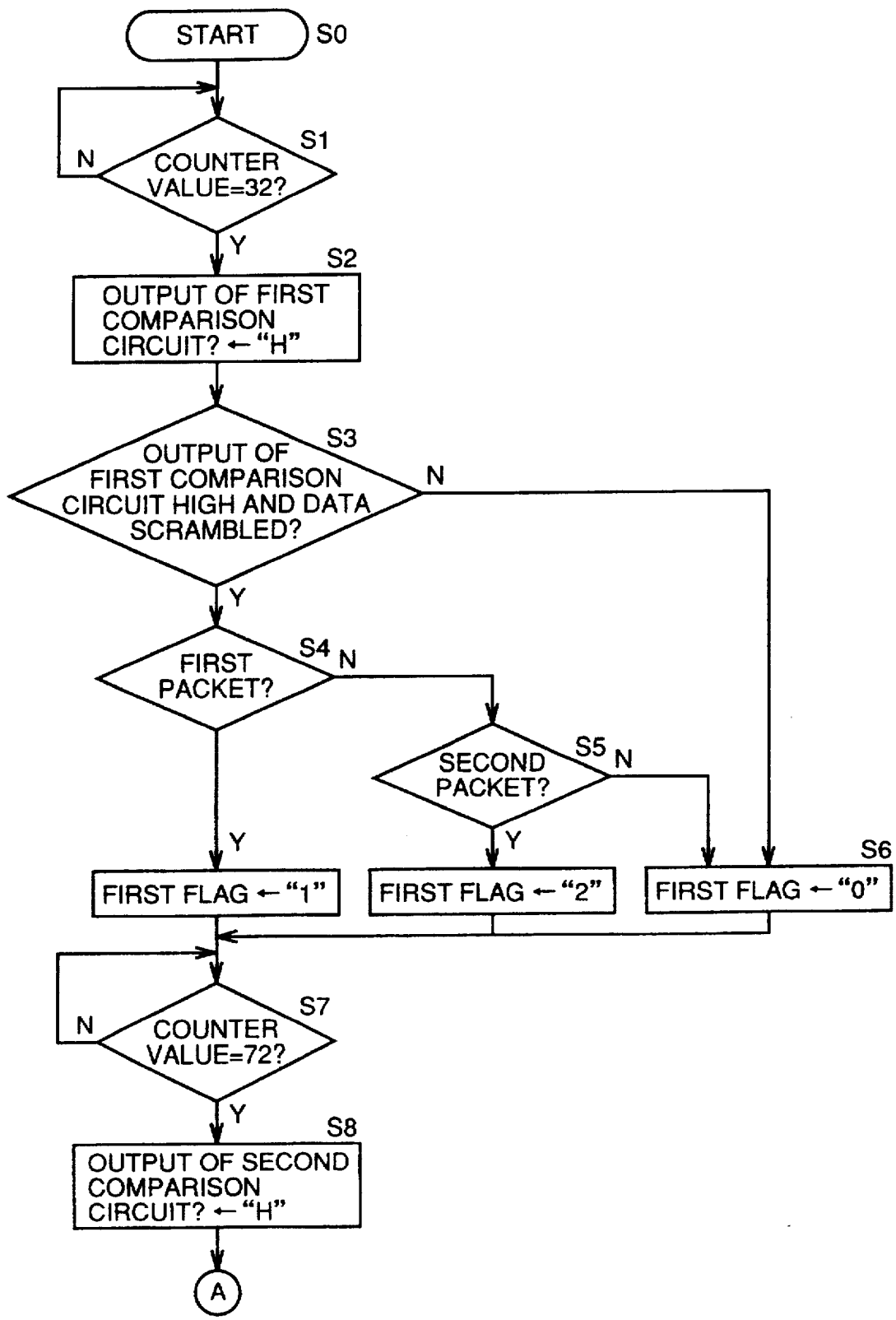
FIG. 20 is a first flow chart showing the operation of the key data fetch circuit according to the second embodiment.

Referring to FIG. 20, the shift register 252 has storage capacity of 40 bits, for example, and successively receives the data from the error correcting circuit 24. The counter circuit 254 counts the in-packet bit number of the newest single bit in the shift register 252. Its cycle is 176 bits, i.e., the data length of a single packet. At this time, the first comparison circuit 256 compares the count value of the counter circuit 254 with a numerical value 32, and outputs a low-level signal until coincidence is determined (step S1).

When the count value of the counter circuit 254 reaches 32, the output of the first comparison circuit 256 is inverted to a high level (step S2).

At this time, a prefix of a data packet is inputted in the shift register 252.

The first flagging circuit 264 determines whether or not the data is encoded on the basis of a service identification code in the prefix stored in the shift register 252 at a timing when the output signal of the first comparison circuit 256 goes high (step S3).

Further, the first flagging circuit 264 identifies a data packet number in the prefix, and determines whether the same is a first packet (step S4), a second packet (step S5), or neither thereof. At this time, the first flagging circuit 264 outputs "1" as a first flag signal if the data following the prefix is scrambled and this is the first packet, outputs "2" as the first flag signal if the data is scrambled and this is a second packet, or outputs "0" as the first flag signal if the data is not encoded or this is neither the first packet nor the second packet on the basis of the result of identification of the service identification code and the data packet number (step S6).

The output of the second comparison circuit 258 is inverted to a high level when the count value of the counter circuit 254 reaches 72 (steps S7 and S8).

When the output of the second comparison circuit 268 is at a high level, there is a possibility that a data header parameter enters the shift register 252.

Figure 21:
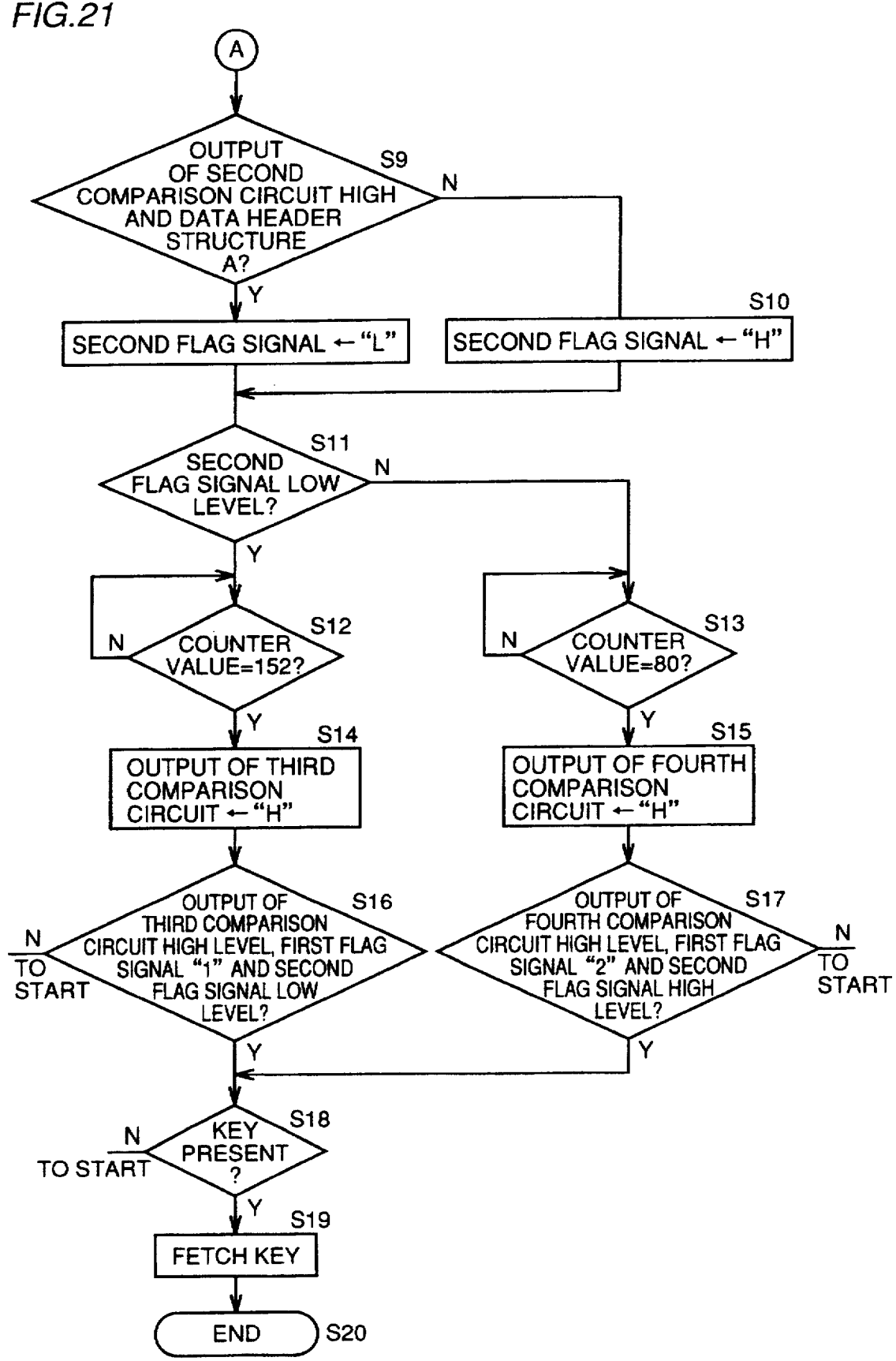
FIG. 21 is a second flow chart showing the operation of the key data fetch circuit according to the second embodiment.

Referring to FIG. 21, the second flagging circuit 266 receives the parallel outputs of the shift register 252 at a timing when the output of the second comparison circuit 258 goes high and identifies the data header parameter (step S9), and outputs a low-level signal as a second flag signal if the data is in the program or page data header structure A, or outputs a high-level signal as the second flag signal if the data is in the program or page data header structure B (step S10).

If the second flag signal is at a low level, there is a possibility that the data area to which the key data belongs is inputted in the shift register 252 if the first flag signal is at a level "1" when the output of the third comparison circuit 260 goes high in response to that the count value of the counter circuit 254 reaches 152 (steps S12 and S14). At this time, the key data extract circuit 268 identifies the data unit parameter of the data area to which the key data belongs, and fetches the key data from the shift register 252 when presence of the key data is determined (step S19).

If the second flag signal is not at a low level (step S11), the key data extract circuit 268 identifies whether or not the value of the first flag signal is "12" (step S17) when the output of the fourth comparison circuit 262 goes high in response to that the count value of the counter circuit 254 reaches 80 (steps S13 and S15).

If the value of the first flag signal is "2", there is a possibility that the data area to which the key data belongs is inputted in the shift register 252, and the key data extract circuit 268 confirms the presence of the key data in response to the data unit parameter of the data area to which the key data belongs (step S18), and fetches the key data from the shift register 252 (step S19).

When absence of the key data in the shift register 252 is determined at the steps S16, S17 and S18, on the other hand, the overall process returns to a start state (step S0) in FIG. 20.

The structures of the first flagging circuit 264, the second flagging circuit 266 and the key data extract circuit 268 performing the aforementioned operations are now described in more detail.

Figure 17:
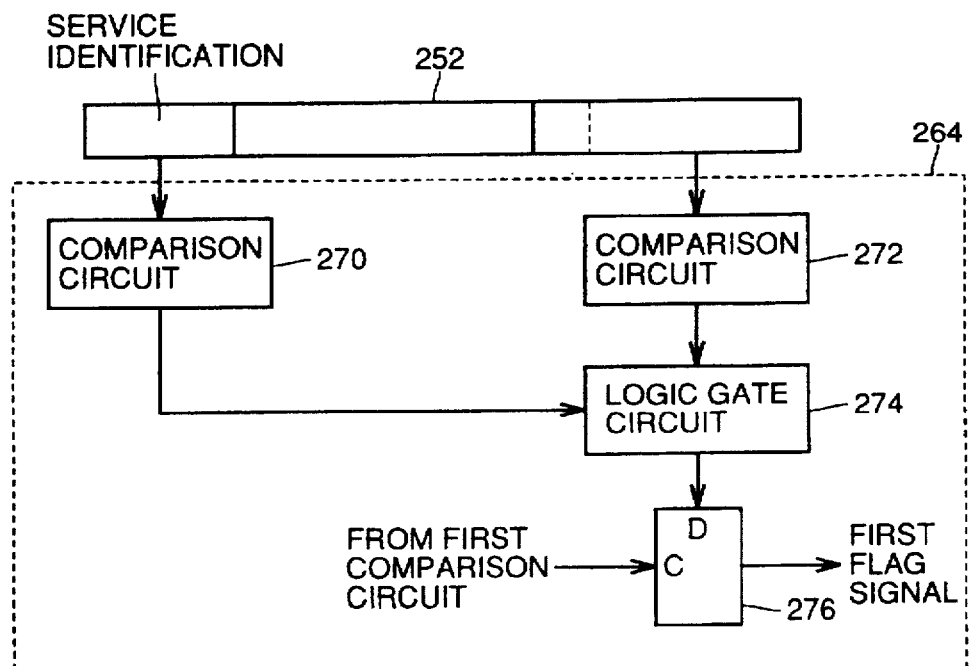
FIG. 17 is a schematic block diagram showing the structure of a first flagging circuit 264 in the key data fetch circuit 350.

FIG. 17 is a schematic block diagram showing the structure of the first flagging circuit 264.

The first flagging circuit 264 includes a comparison circuit 270 for receiving upper parallel outputs of a prescribed number of bits from the shift register 252 and detecting whether or not the value is any one of 4, 5 and 6, i.e., whether or not the service identification code indicates that the data is encoded, a comparison circuit 272 for receiving lower parallel outputs of a prescribed number of bits from the shift register 252 and detecting which one of 0, 1 and another numeral the value is, i.e., whether the data packet number is 0, 1 or another value, a logic gate circuit 274 for receiving outputs of the comparison circuits 270 and 272 and outputting a signal "1" when the data is scrambled and the data packet number is 0, outputting a signal "2" when the data is encoded and the data packet number is 1, or outputting a signal "0" in other cases, and a flip-flop 276 for receiving an output of the logic gate circuit 274 in response to inversion of the output signal from the first comparison circuit 256 to a high level, holding the value and outputting the same as the first flag signal.

Therefore, the first flagging circuit 264 outputs the first flag signal in response to the service identification code in the prefix and the data packet number when the output of the first comparison circuit 256 goes high, i.e., when the prefix of the data packet is inputted in the shift register 252.

Figure 18:
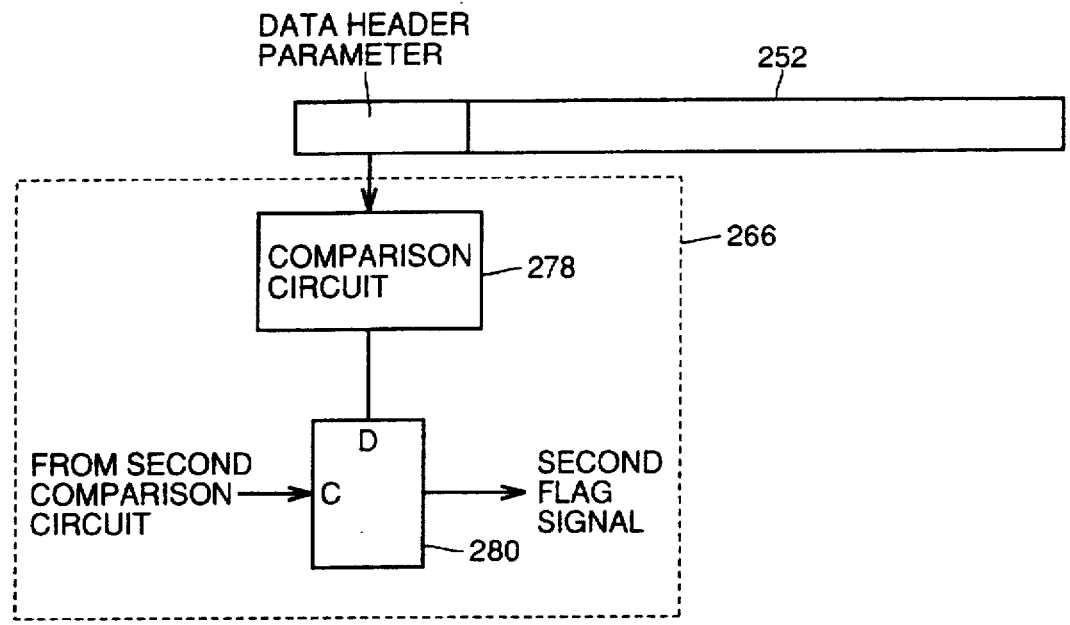
FIG. 18 is a schematic block diagram showing the structure of a second flagging circuit 266 in the key data fetch circuit 350.

FIG. 18 is a schematic block diagram showing the structure of the second flagging circuit 266.

The second flagging circuit 266 includes a comparison circuit 278 for receiving parallel outputs of a prescribed number of bits from the head of the shift register 252 and outputting a low-level signal when the key data is present in the first packet or outputting a high-level signal when the key data is present in the second packet in response to the value of the data header parameter, and a D flip-flop circuit 280 for latching an output signal of the comparison circuit 278 and outputting the same as a second flag signal in response to inversion of the output signal of the second comparison circuit 258 to a high level.

Thus, the second flagging circuit 266 outputs a low-level second flag signal if the key data is present in the first packet or outputs a high-level second flag signal if the key data is present in the second packet when the output signal of the second comparison circuit 258 goes high, i.e., when the data header parameter is inputted in the shift register 252, in response to the value.

Figure 19:
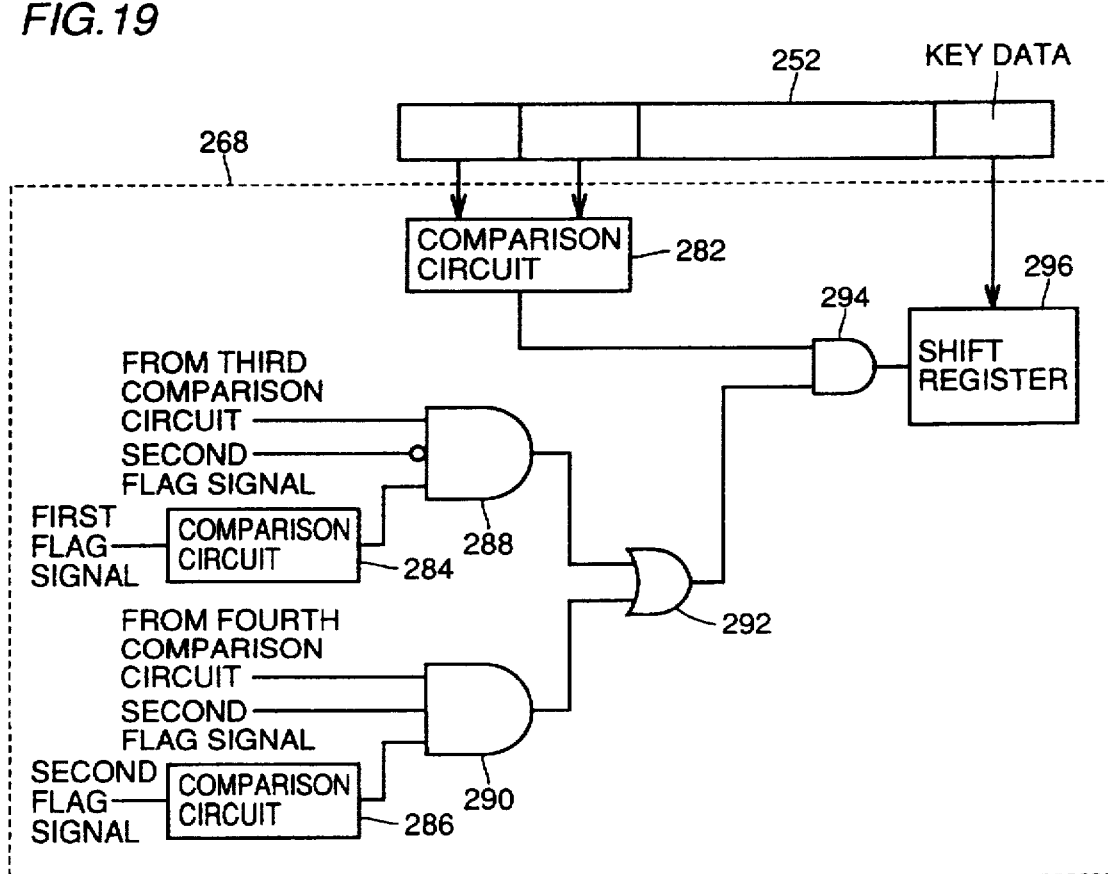
FIG. 19 is a schematic block diagram showing the structure of a key data extract circuit 268 in the key data fetch circuit 350.

FIG. 19 is a schematic block diagram showing the structure of the key data fetch circuit 268.

The key data extract circuit 268 includes a comparison circuit 282 for receiving parallel outputs of a prescribed number of bits (e.g., two bytes) from the head of the shift register 252 and outputting a high-level signal when the values are 1F and 50 in hexadecimal respectively, for example, a comparison circuit 284 for outputting a high-level signal when the first flag signal is "1", a logic gate circuit 288 for outputting a high-level signal when the outputs of the comparison circuit 284 and the third comparison circuit 260 are at high levels and the second flag signal is at a low level, a comparison circuit 286 for outputting a high-level signal when the first flag signal is "2", a logic gate circuit 290 for outputting a high-level signal when all of the outputs of the comparison circuit 286 and the fourth comparison circuit 262 and the second flag signal are at high levels, an OR circuit 292 for receiving outputs of the logic gate circuits 288 and 290, an AND circuit 294 for receiving outputs of the comparison circuit 282 and the OR circuit 292, and a shift register 296 for receiving lower parallel outputs of a prescribed number of bits from the shift register 252 in response to inversion of the output of the AND circuit 294 to a high level. The shift register circuit 296 outputs the key data.

Namely, that the key data extract circuit 268 fetches the key data from the shift register 252 in the following two cases:

i) When the first flag signal is "1", the second flag signal is at a low level, the output of the third comparison circuit 260 is at a high level, and the data unit parameter indicates that the key data is present in the following data area:

This corresponds to such a case that the data inputted in the shift register 252 is that of the first packet and in the program or page data header structure A, the key data is present in the first packet, and the third comparison circuit 260 detects that the data area to which the key data belongs is inputted in the shift register 252.

ii) When the first flag signal is "2", the second flag signal is at a high level, and the output of the fourth comparison circuit 262 is at a high level:

This corresponds to such a case that the data is in the program or page data header structure B, the key data is included in the second packet, and the fourth comparison circuit 262 detects that the data area including the key data is inputted in the shift register 252.

In each of the aforementioned cases i) and ii), the key data is incorporated in the shift register 296 only when the data unit parameter indicates that this unit includes the key data among the data included in the shift register 252.

Due to the aforementioned structure, the key data is extracted only when data encoding is confirmed through the service identification code in the prefix and it is also confirmed that the key data is included in the data unit inputted in the shift register 252, whereby the certainty of the key data extract operation is improved.

It is possible to implement fetching of key data also when the packet number including the key data and the in-packet position are varied with the data structure, by employing the aforementioned structure of the key data fetch circuit 350. Further, the shift register 252 requires no storage capacity for a single packet, whereby a data delay by the shift register 252 can be minimized.

While the second embodiment has been described with reference to such a case that the position provided with the key data is varied in two ways, the present invention is also applicable to such a case that the position to which the key data belongs is varied in larger ways with the data structure, as a matter of course.

[Decoding Processing Circuit]

Figure 22:
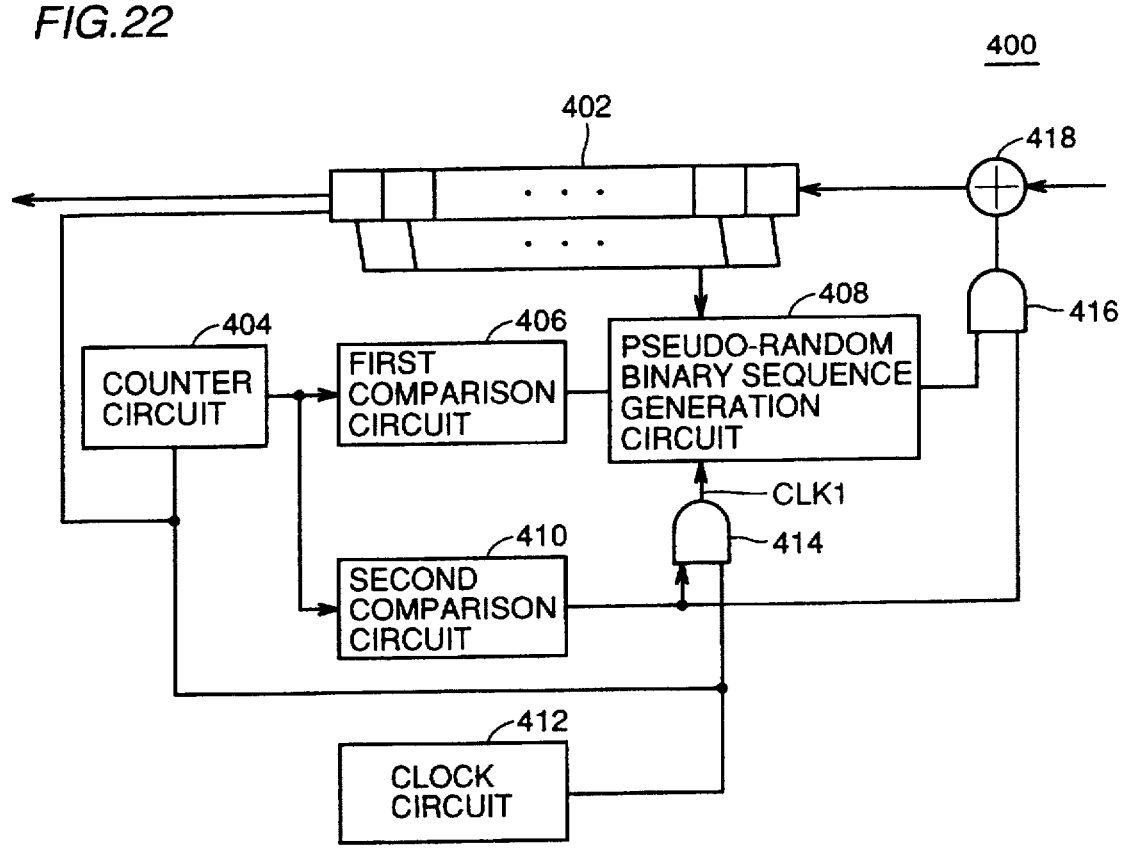
FIG. 22 is a schematic block diagram showing the structure of a decoding processing circuit 400 in the FM multiplex broadcasting receiver according to the present invention.

FIG. 22 is a schematic block diagram showing the structure of the decoding processing circuit 400 in the digital signal receiver 100 shown in FIG. 10.

The decoding processing circuit 400 may be in a structure of fetching the data group number to which the packet data belongs and the data packet number of the packet data in the data group as to each packet data and decoding encoded information data included in the packet data on the basis of the data group number and the data packet number, for example.

In order to further reliably keep concealability of information, it is preferable to perform the decoding processing not on the basis of the data group number and the data packet number alone, but on the basis of the data group number, the data packet number and the key data extracted by the key data fetch circuit 300.

Figure 26:
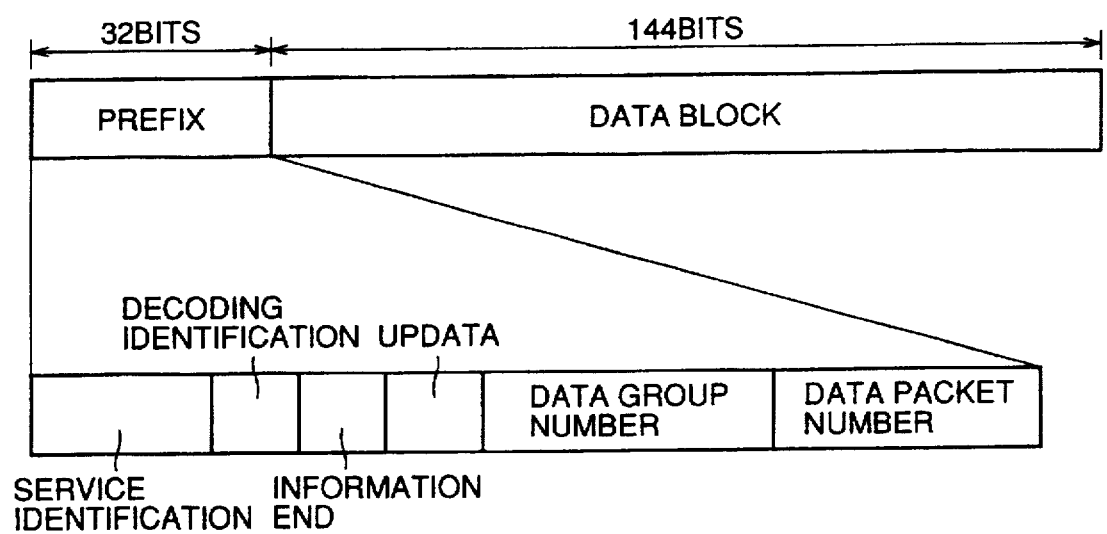
FIG. 26 is a block diagram showing the structure of packet data in FM multiplex broadcasting.

Before explaining the structure and the operation of the decoding processing circuit 400 in detail, the structure of the transmitted packet data is now described with reference to FIG. 26.

As shown in the hierarchy 3 in FIG. 1, the data packet comprises of a 32-bit prefix and a following 144-bit data block. FIG. 26 is a block diagram showing the data structure of this data packet.

It is assumed that the head four bits of the prefix form a service identification code, and the data block of the data packet to which this prefix belongs is scrambled if the value is 4, 5 or 6, as described above. A 1-bit decoding identification code following the service identification code indicates whether error correction is made with only a transverse correction code or a product code. A 1-bit information end code following the same is "1" when the data group is ended, or "0" in other cases. A 2-bit update code following the same indicates updating of the data group.

A data group number present in the ninth to 22th bits indicates the data group to which the data packet belongs, and a data packet number present in the 23rd to 32nd bits indicates the order of the data packet transmitted for every data group number.

Figure 8:
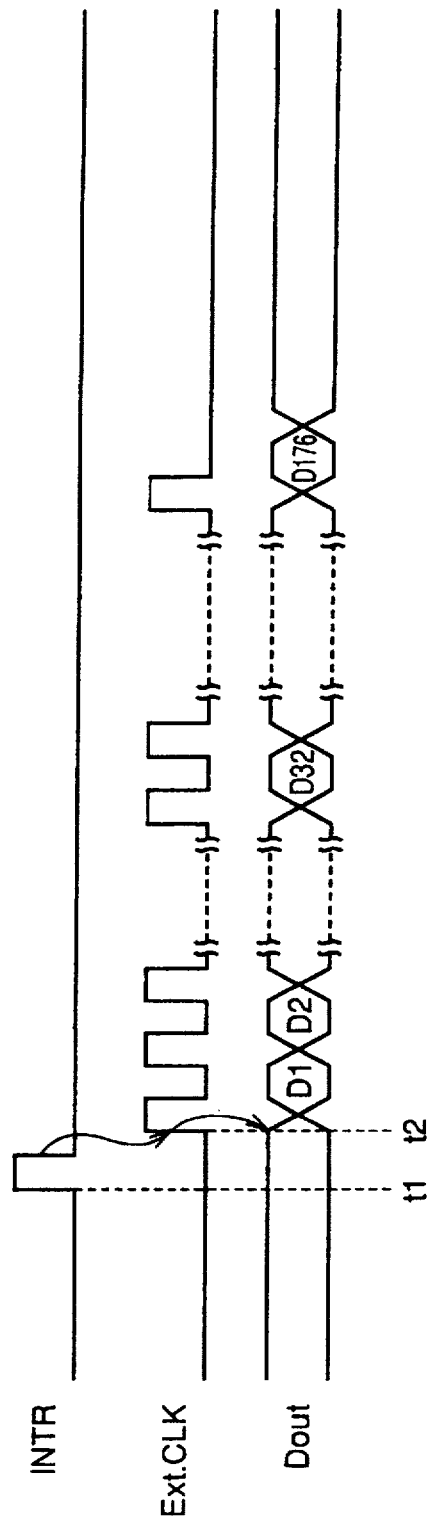
FIG. 8 is a timing chart showing data input/output timings in a conventional FM multiplex broadcasting receiver.

A data block present in the 33rd to 176th bits is a part further reconstructed to a data group and program data in the CPU 40 in the conventional FM multiplex broadcasting receiver 10 shown in FIG. 8, and forms a body part of transmitted data.

When transmit data is transmitted in a scrambled manner, the data of the data block area is encrypted and decoded on the basis of an initial value generated by master key data common for the data group, the data group number and the data packet number, for example.

Referring again to FIG. 22, the decoding processing circuit 400 according to the embodiment of the present invention includes a shift register 402, a counter circuit 404, a first comparison circuit 406, a pseudo-random binary sequence generation circuit 408, a second comparison circuit 410, a clock circuit 412, an AND circuit 414 for receiving outputs of the second comparison circuit 410 and the clock circuit 412 and outputting an AND operation result to the pseudo-random binary sequence generation circuit 408, an AND circuit 416 for receiving outputs of the second comparison circuit 410 and the pseudo-random binary sequence generation circuit 408 and outputting an AND operation result to an exclusive OR circuit 418, and the exclusive OR circuit 418 for receiving receive data and an output of the AND circuit 416 and outputting an exclusive OR operation result to the shift register 402.

The shift register 402 is not particularly restricted but a 32-bit shift register, for example, and successively receives packet data outputted from the error correcting circuit 24. The counter circuit 404 indicates the in-packet bit number of the newest single bit in the shift register 402. It is assumed that the counter circuit 404 performs a counting operation in a cycle of the data length of a single packet, i.e., 176 bits in this case.

The first comparison circuit 406 outputs a high-level signal to the pseudo-random binary sequence generation circuit 408 at a point when the value of the counter circuit 404 reaches 32, i.e., when whole prefix in packet data is inputted in the shift register 402.

The pseudo-random binary sequence generation circuit 408 fetches a data group number and a data packet number included in the prefix outputted from the shift register 402 in parallel in response to the inversion of the output of the first comparison circuit 406 to a high level.

Further, the pseudo-random binary sequence generation circuit 408 generates a pseudo-random binary sequence on the basis of an initial value which is formed by performing a prescribed logical operation on key data included in a specific data packet among those belonging to the same data group previously extracted by the key data fetch circuit 300, the data group number and the data packet number.

The second comparison circuit 410 compares the output of the counter circuit 404 with numerical values 32 and 176, and outputs a high-level signal if the output of the counter circuit 404 is in excess of 32 and less than 176. In this case, data thereafter inputted in the decoding processing circuit 400 is that belonging to the data block and corresponds to a encoded range in encoded transmitted data.

The clock circuit 412 is a generation source for a clock signal, and supplies the clock signal to the shift register 402, the counter circuit 404 and the AND circuit 414.

The AND circuit 414 receives outputs of the second comparison circuit 410 and the clock circuit 412, and outputs an AND operation result to the pseudo-random binary sequence generation circuit 408. Namely, the output of the clock circuit 412 is outputted to the pseudo-random binary sequence generation circuit 408 in a period when the output of the second comparison circuit 410 is at a high level, i.e., when data block data is inputted in the subsequent timing.

The pseudo-random binary sequence generation circuit 408 generates a pseudo-random binary sequence signal in response to the clock signal outputted from the AND circuit 414, as described later.

The AND circuit 416 receives outputs of the pseudorandom binary sequence generation circuit 408 and the second comparison circuit 410, and outputs an AND operation result. Namely, the output of the pseudo-random binary sequence generation circuit 408 is outputted from the AND circuit 416 in a period when the block data is inputted in the decoding processing circuit 400.

Figure 3B:
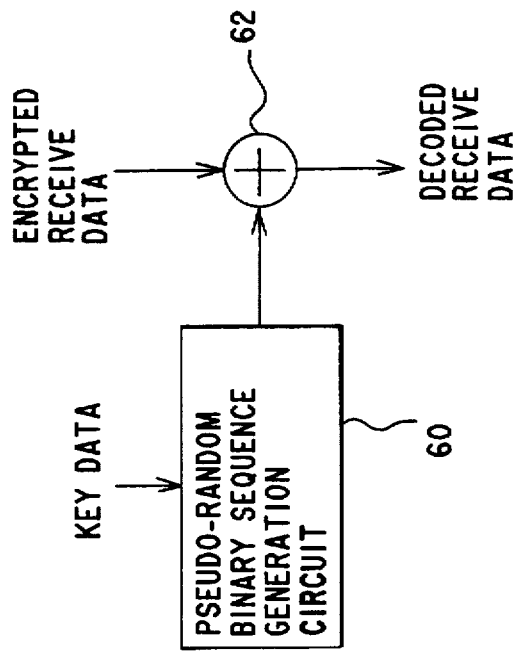
FIGS. 3(a) and 3(b) show methods of scrambling transmit data and decoding encoded receive data, respectively.
Figure 3A:
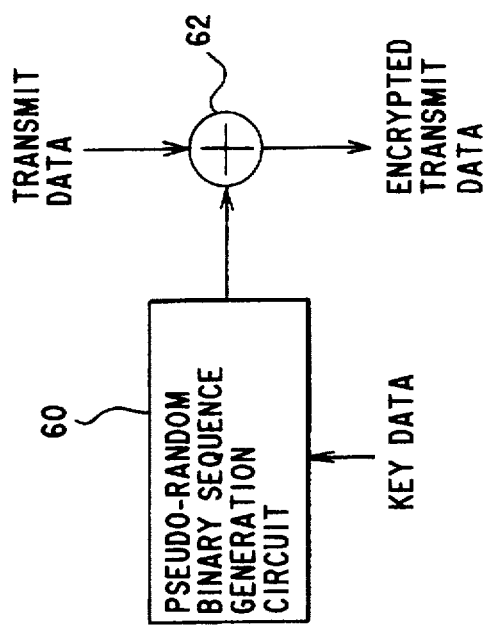
Figure 5:
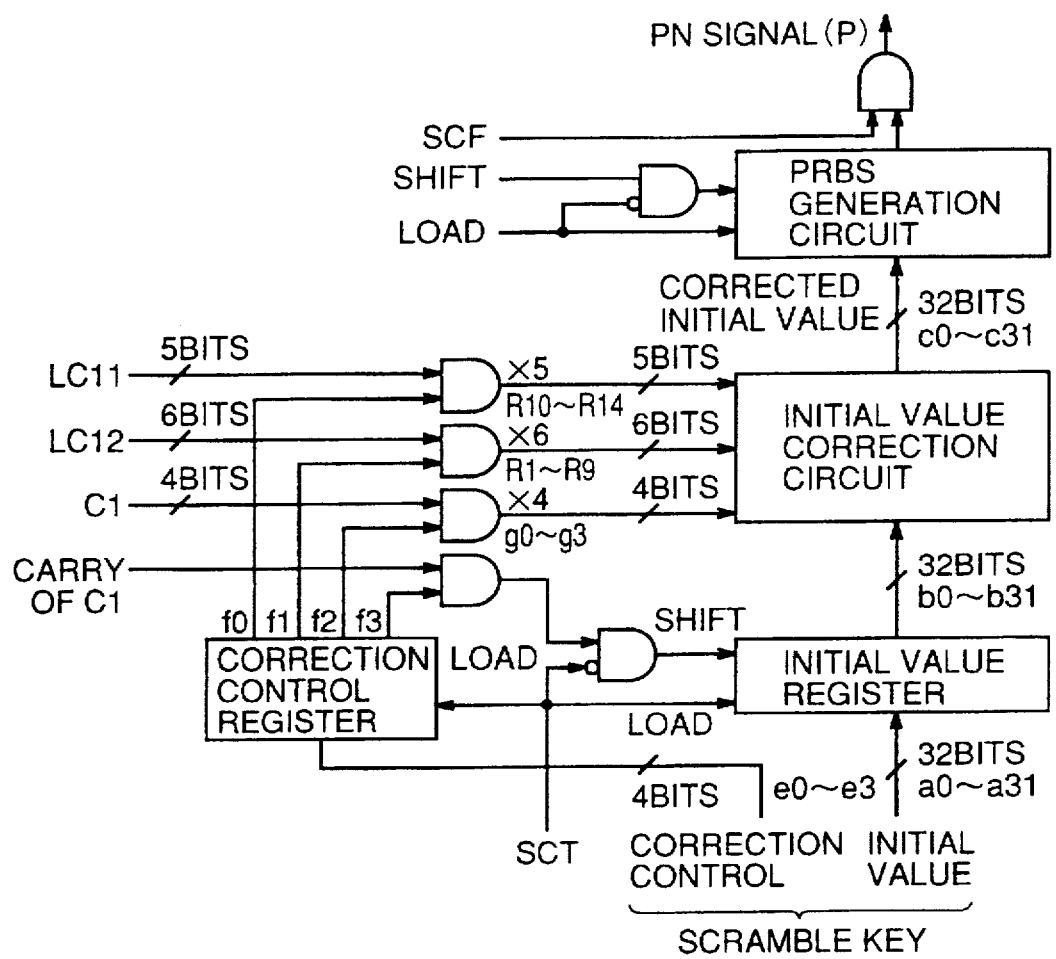
FIG. 5 is a block diagram showing an exemplary pseudo-random number sequence signal generation circuit employed for satellite data broadcasting.
Figure 6:
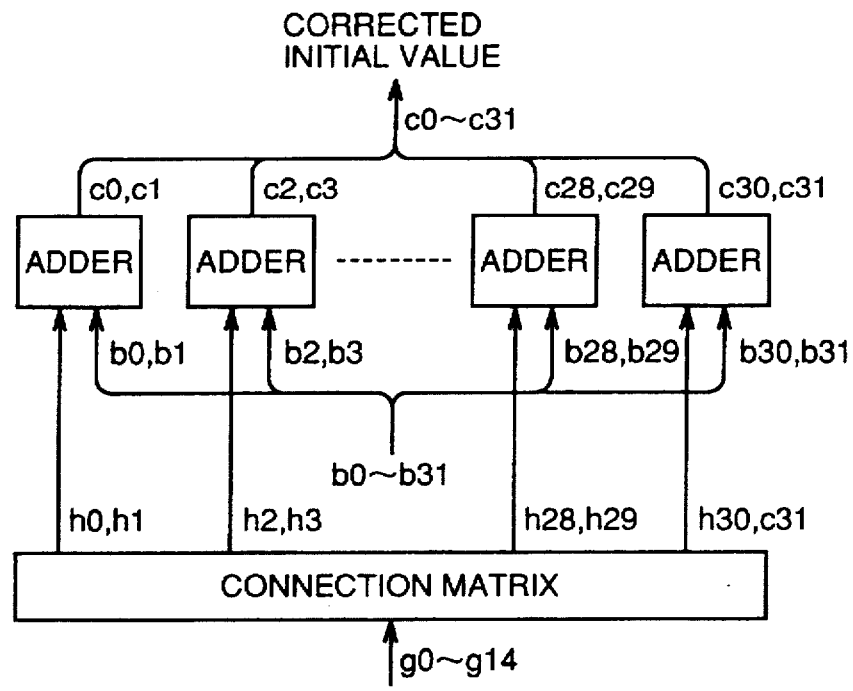
FIG. 6 is a block diagram showing an initial value correcting circuit in the circuit shown in FIG. 5.
Figure 7:
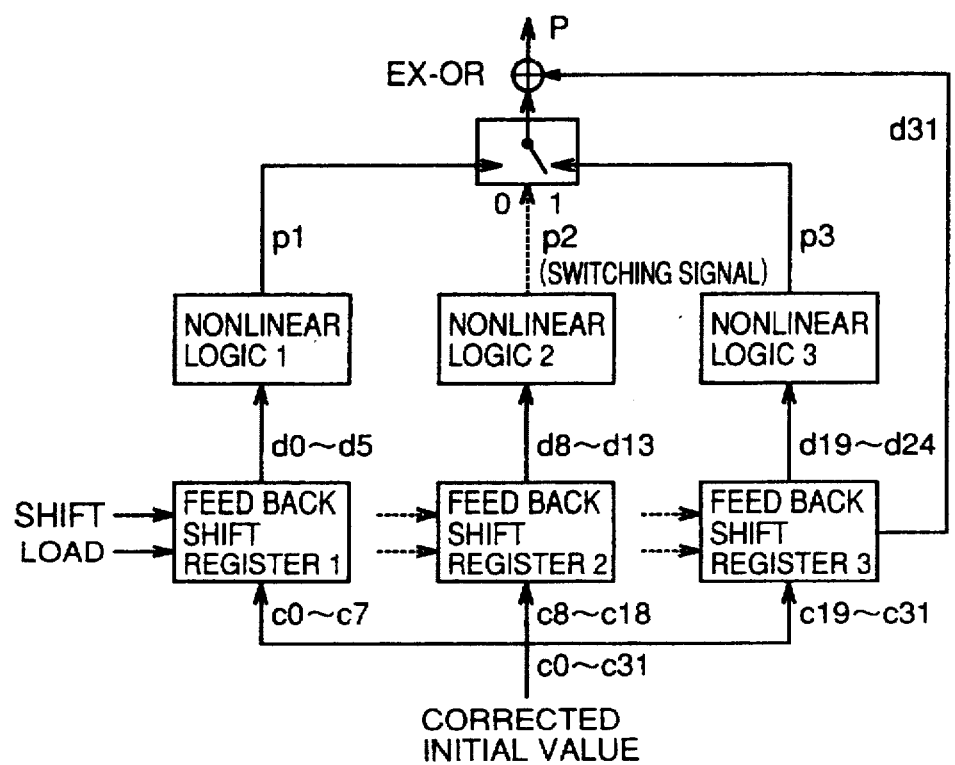
FIG. 7 is a block diagram showing an exemplary pseudo-random binary sequence generation circuit in the circuit shown in FIG. 5.

The exclusive OR circuit 418 receives the output of the AND circuit 416 and the packet data outputted from the error correcting circuit 24, and outputs an exclusive OR operation result to the shift register 402. Namely, encoded data is decoded by this exclusive OR operation, in accordance with the principle described with reference to FIGS. 3(a) and 3(b).

It is also possible to attain such a structure that the output of the encoding determination circuit 200 is also inputted in the AND circuit 416 and the output of the pseudo-random binary sequence generation circuit 408 is outputted from the AND circuit 416 only when the receive data is encoded.

Namely, the AND circuit 416 outputs the output of the pseudo-random binary sequence generation circuit 408 to the exclusive OR circuit 418 when the encoding detection signal from the encoding determination circuit 200 is at a high level.

The exclusive OR circuit 418 receives the packet data and the output signal of the pseudo-random binary sequence generation circuit 408 from the AND circuit 416, and outputs an exclusive OR operation result to the CPU 40.

When the packet data is encoded, therefore, the output of the exclusive OR circuit 418 is formed by decoding encoded receive packet data.

When the packet data is not encoded, on the other hand, the output of the AND circuit 416 goes low, whereby the exclusive OR circuit 418 outputs the inputted packet data to the CPU 40 as such.

Due to the aforementioned structure, the packet data is decoded on the basis of the key data transmitted through a data channel only when the received packet data is encoded, whereby only the user having the FM multiplex broadcasting receiver 100 of this structure can decode and read the scrambled encrypted data while a user having the conventional FM multiplex broadcasting receiver 10 cannot recognize the content of the scrambled transmit data.

Figure 23:
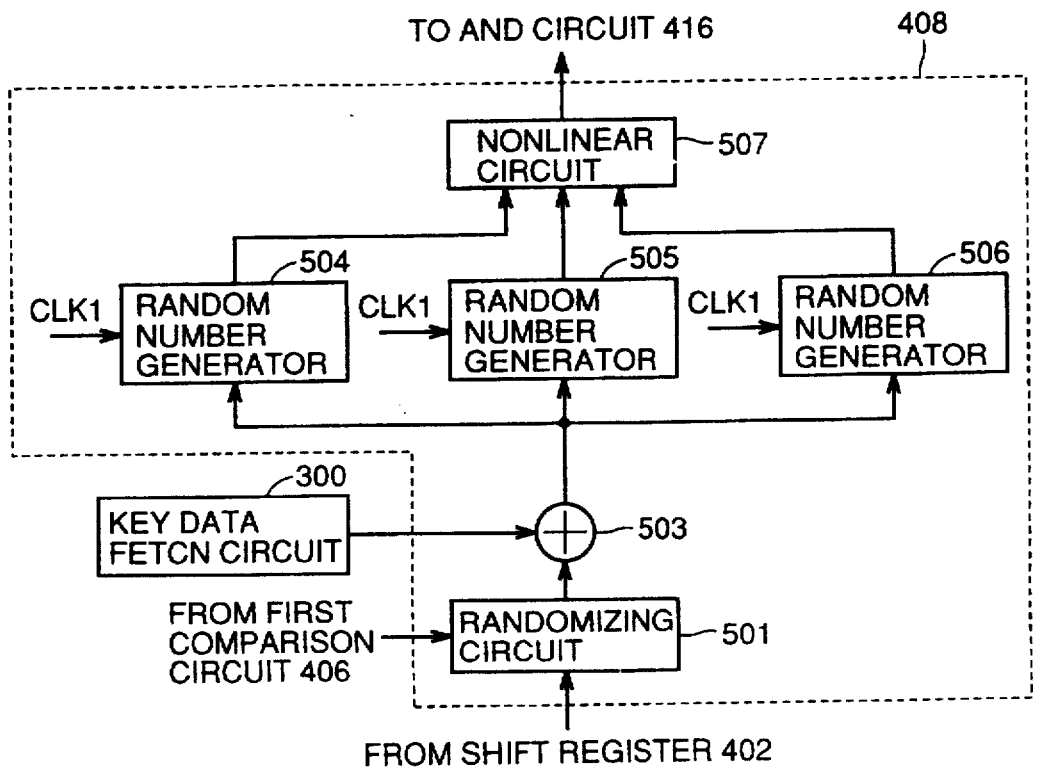
FIG. 23 is a schematic block diagram showing the structure of a pseudo-random binary sequence generation circuit 408 in the decoding processing circuit according to the present invention.

FIG. 23 is a schematic block diagram showing the structure of the pseudo-random binary sequence generation circuit 408.

The pseudo-random binary sequence generation circuit 408 includes a randomizing circuit 501 for receiving parallel outputs from the shift register 402, an exclusive OR circuit 503 for receiving outputs of the randomizing circuit 501 and the key data fetch circuit 300, random number generators 504 to 506 for generating pseudo-random numbers with an initial value of an output of the exclusive OR circuit 503, and a nonlinear circuit 507 for receiving outputs of the random number generators 504 to 506 and outputting a nonlinear operation result.

The randomizing circuit 501 receives ninth to 32nd bit parallel outputs of the shift register 402, i.e., the data group number and the data packet number, in response to inversion of the output signal of the first comparison circuit 406 to a high level, and performs randomizing processing. The key data fetch circuit 300 extracts and outputs key data included in a prescribed data packet. The exclusive OR circuit 503 performs an exclusive OR operation on each bit of the outputs of the key data fetch circuit 300 and the randomizing circuit 501 and outputs the same as initial data.

The random number generators 504, 505 and 506 are m sequence generators which generate pseudo-random binary sequences with an initial value of the output of the exclusive OR circuit 503 in response to that the second comparison circuit 410 outputs a high-level signal when the count value of the counter circuit 404 is in excess of 32 and less than 176 and the output of the clock circuit 412 is outputted from the AND circuit 414 as a signal CLK1.

In this case, it is possible to take such a structure that initial values of the random number generators 504 to 506, 505 and 506 are formed by upper bit data, intermediate bit data and lower bit data of prescribed numbers of bits respectively among initial data outputted from the exclusive OR circuit 503, although this structure is not particularly restricted.

The nonlinear circuit 507 nonlinearly processes the outputs of the random number generators 504 to 506 and outputs the result. The m sequence generators forming the random number generators 504 to 506 are generally formed by feedback registers, and such nonlinear processing is performed on pseudo-random binary sequence signals outputted from the same, so that the encoded data is further hard to decode.

Figure 24:
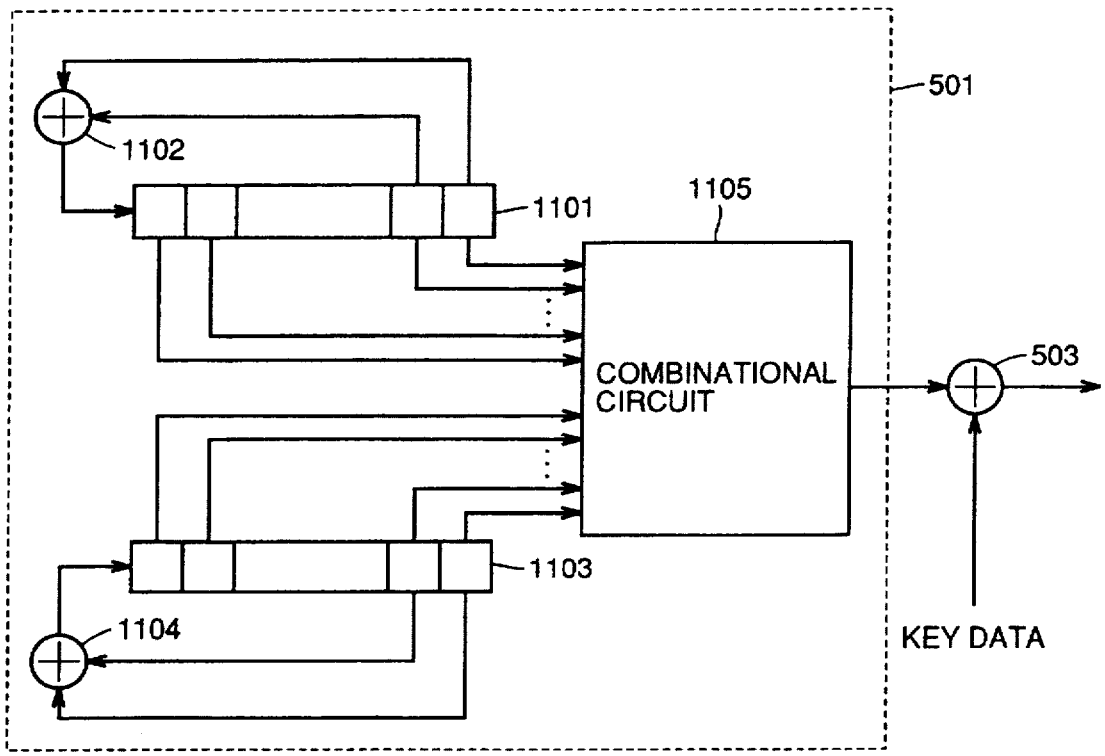
FIG. 24 is a schematic block diagram showing the structure of a randomizing circuit 501 in the pseudorandom binary sequence generation circuit 408.

FIG. 24 is a schematic block diagram showing the structure of the randomizing circuit 501.

The randomizing circuit 501 includes a shift register 1101 for receiving parts of the data packet number and the data group number as initial values, an exclusive OR circuit 1102 for receiving parallel outputs from a prescribed bit position of the shift register 1101 and feeding back an exclusive OR operation result to the input of the shift register 1101, a shift register 1103 for operating at an initial value defined by the data group number, an exclusive OR circuit 1104 for receiving parallel outputs from a prescribed bit position of the shift register 1103 for feeding back an exclusive OR operation result to the input of the shift register 1103, and a combinational circuit 1105 for receiving parallel outputs from the shift registers 1101 and 1103, performing a combinational operation and outputting a random number of a prescribed bit number.

The shift register 1101 is a 14-bit shift register, for example. The exclusive OR circuit 1102 receives proper parallel outputs of the shift register 1101 such as 13-th and 14-th bit outputs, for example, and feeds back the outputs to the input of the shift register 1101. In this case, a feedback register formed by the shift register 1101 and the exclusive OR circuit 1102 preferably defines an m sequence generator.

The shift register 1101 is stopped after parts of the data packet number (10 bits) and the data group number (14 bits) are set as initial values and a shift operation is performed by a prescribed number of times such as 14 times, for example. At this time, respective parallel outputs of the shift register 1101 are randomized.

The shift register 1103 is a 14-bit shift register, for example. The exclusive OR operation circuit 1104 receives proper parallel outputs of the shift register 1103 such as 13-th and 14-th bit outputs, for example, and feeds back the outputs to the input of the shift register 1103. In this case, a feedback register formed by the shift register 1103 and the exclusive OR circuit 1104 preferably defines an m sequence generator.

The shift register 1103 is stopped after the data group number (14 bits) is set as an initial value and a shift operation is performed by a prescribed number of times such as 14 times, for example. At this time, parallel outputs from respective registers of the shift register 1103 are randomized.

The combinational circuit 1105 combines the parallel outputs from the respective registers of the shift registers 1101 and 1103, and obtains a 32-bit output, for example.

The exclusive OR circuit 503 exclusively ORs the output of the combinational circuit 1105 and each bit of the key data, and outputs a 32-bit random number. This 32-bit random number is supplied to the random number generators 504 to 506 as an initial value respectively.

Figure 25:
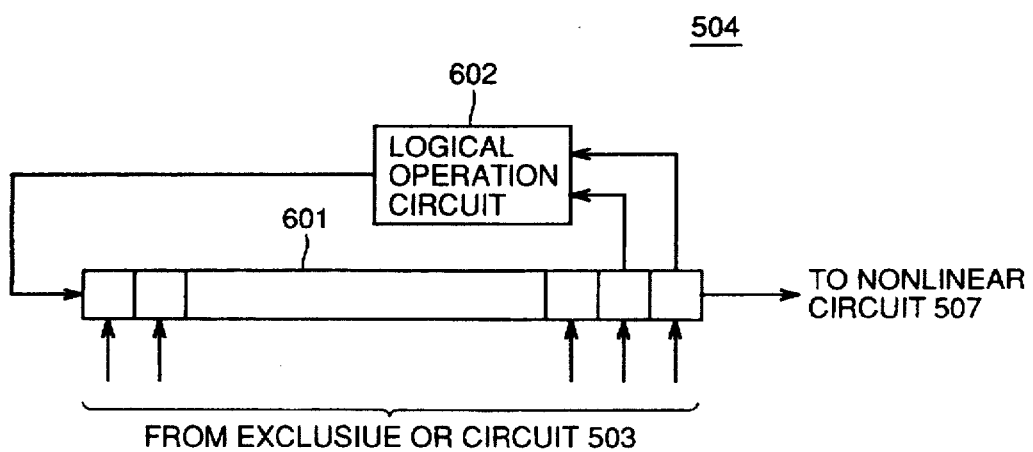
FIG. 25 is a schematic block diagram showing the structure of a random number generator 504 in the pseudorandom binary sequence generation circuit 408.

FIG. 25 is a schematic block diagram showing the structure of each of the random number generators 504 to 506.

The random number generators 504 to 506 can be basically provided in the same structures, and FIG. 25 shows a principal part of the random number generator 504.

The random number generator 504 includes an L-bit shift register 601 for receiving L-bit random number data, for example, among the 32-bit random number data outputted from the exclusive OR circuit 503 and distributed to prescribed bit lengths, and a logical operation circuit 602 for receiving parallel outputs from the L-th and (L-1)-th bit of the shift register 601 and feeding back a logical operation result to the input of the shift register 601.

When a feedback register formed by the shift register 601 and the logical operation circuit 602 defines an m sequence generator, the maximum cycle of signal sequences outputted from the shift register 601 is $2^{L-1}$.

Due to the aforementioned structure, it is possible to decode information data transmitted in an encrypted manner by key data included in a specific data packet among those belonging to the same data group and a pseudorandom binary sequence signal generated on the basis of initial data formed by a data group number and a data packet number included in each data packet.

In this case, further, the bit length of the shift register 402 through which packet data passes can be made smaller than the bit length of the data packet, whereby the stage numbers of shift registers can be reduced for suppressing a data delay following decoding.

Further, the decoding processing circuit 400 of the aforementioned structure can perform decoding processing of receive data as such by being serially inserted immediately in front of an input of a CPU in a conventional FM multiplex broadcasting receiver.

[Third Embodiment]

Figure 27:
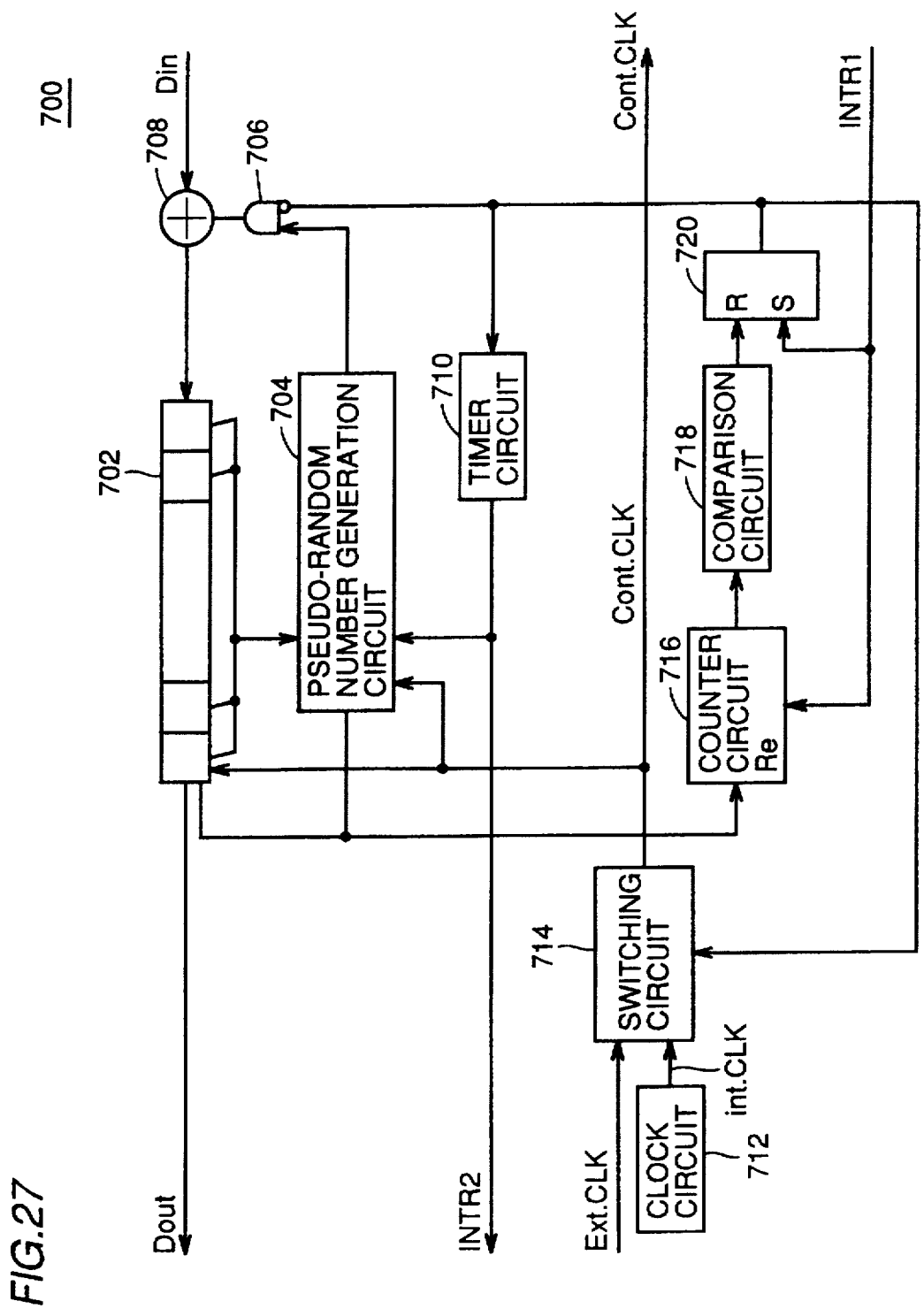
FIG. 27 is a schematic block diagram showing the structure of a decoding processing circuit 700 according to a third embodiment of the present invention.

FIG. 27 is a schematic block diagram showing another exemplary structure of a decoding processing circuit 700 corresponding to the decoding processing circuit 400 in the digital signal receiver 100 shown in FIG. 10.

The decoding processing circuit 700 receives an output $D_{in}$ from the error correcting circuit 24. The decoding processing circuit 700 decodes the signal $D_{in}$, and thereafter outputs an output signal $D_{out}$ to the CPU 40.

Referring to FIG. 27, the decoding processing circuit 700 according to this embodiment includes a shift register 702, a pseudo-random number generation circuit 704, a logic gate circuit 706 for receiving an output of the pseudo-random number generation circuit 704 and outputting the same while being controlled by a timing detection signal, and an exclusive OR circuit 708 for receiving the input data $D_{in}$ from the error correcting circuit 24 and performing an exclusive OR operation for outputting the result to the shift register 702.

The decoding processing circuit 700 further includes a counter circuit 716 which is reset in response to a first interruption signal INTR1 from the error correcting signal for counting the bit number of the data inputted in the shift register 702, a comparison circuit 718 for receiving a count value of the counter circuit 716 and detecting that a prefix of data is inputted in the shift register 702, and an RS flip-flop circuit 720 having an output which is set by the signal INTR1 and reset by an output of the comparison circuit 718, an internal clock circuit 712, a switching circuit 714 for receiving an internal clock signal int.CLK and an external clock signal Ext.CLK from the CPU 40 and outputting either clock signal to the shift register 702, the pseudo-random number generation circuit 704 and the error correcting circuit 24 while being controlled by an output signal of the RS flip-flop circuit 720, and a timer circuit 710 which starts counting in response to setting of the output of the RS flip-flop circuit 720 for outputting a second interruption signal INTR2 to the CPU 40 after a lapse of a prescribed time.

The shift register 702 is not particularly restricted but a 32-bit shift register, for example, which successively receives packet data outputted from the error correcting circuit 24. The pseudo-random generation circuit 704 detects that a prefix of packet data is inputted in the shift register 702 and receives parallel outputs from the shift register 702 for extracting a data group number and a data packet number and forming an initial value for generating a pseudo-random number on the basis of master key data previously extracted by a key data fetch circuit (not shown) thereby generating a pseudo-random binary sequence (e.g., an m sequence (maximum-length sequence)) on the basis of the initial value. The operation of the pseudo-random number generation circuit 704 outputting the pseudo-random binary sequence is started in response to activation of the second interruption signal INTR2 outputted from the timer circuit 710, and controlled by an operation control clock signal Cont.CLK outputted from the switching circuit 714.

The logic gate circuit 706 receives outputs of the pseudo-random number generation circuit 704 and the RS flip-flop circuit 720, and outputs the output of the pseudo-random number generation circuit 704 to the exclusive OR circuit 708 in a period when the output of the RS flip-flop circuit 720 is at a low level.

The exclusive OR circuit 708 exclusively ORs an output signal of the logic gate circuit 706 and the input signal $D_{in}$, thereby decoding the input signal $D_{in}$ and outputs the result to the shift register 702.

Therefore, decoding in the exclusive OR circuit 708 is performed only in a period when the output of the RS flip-flop circuit 720 is in a reset state (low level) and the external clock signal Ext.CLK is outputted from the CPU 40 in response to the second interruption signal INTR2 outputted from timer circuit 710.

The pseudo-random binary sequence outputted from the pseudo-random number generation circuit 704, which is generated by the same initial value and the same arithmetic processing employed for encrypting in case of transmitting FM multiple broadcasting data, is identical to that in encrypting, and decoding processing is performed in accordance with the principle described with reference to FIGS. 3(a) to 4(b).

The operation of the decoding processing circuit 700 according to this embodiment is now described.

Figure 28:
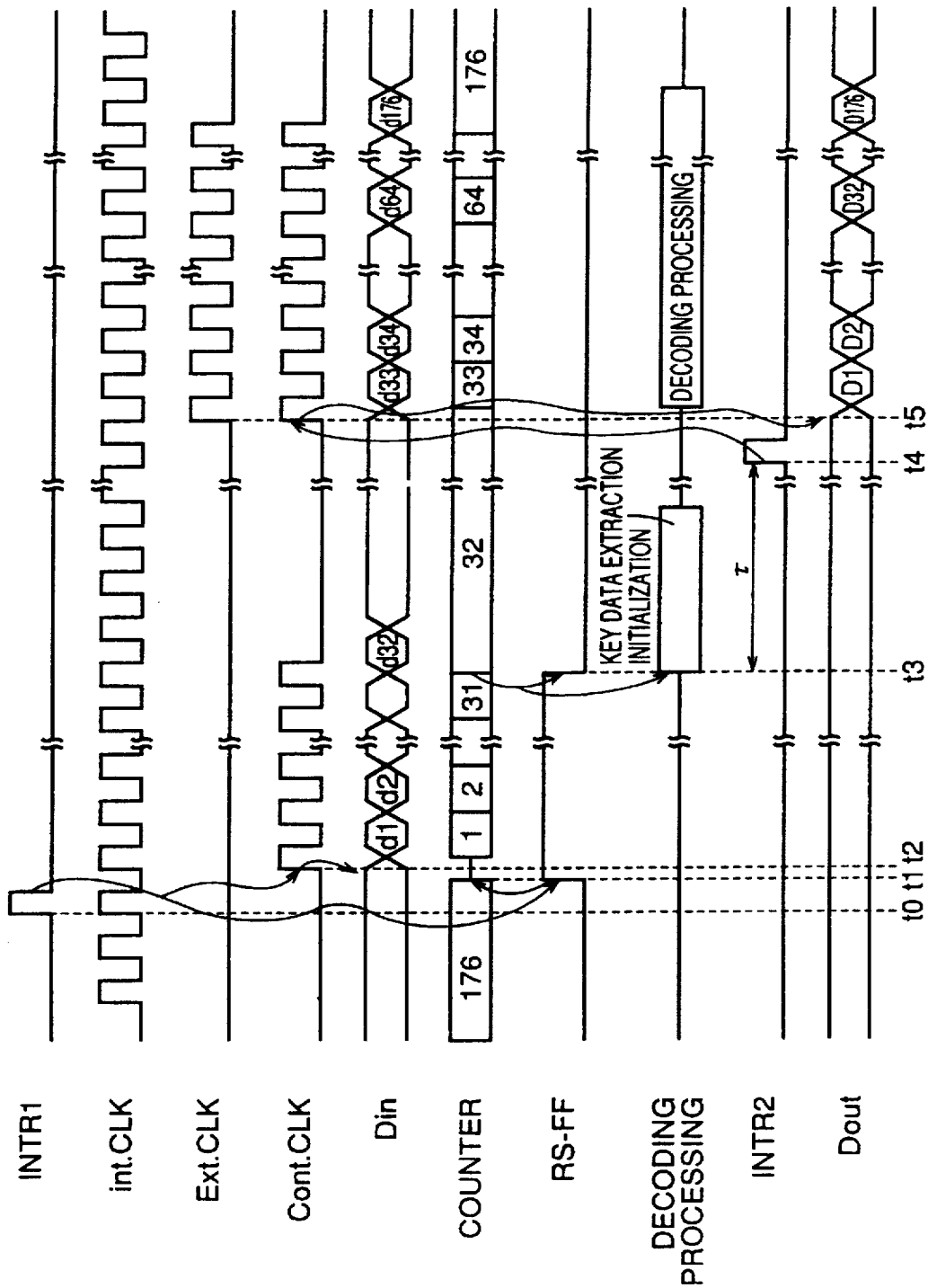
FIG. 28 is a timing chart showing the operation of the decoding processing circuit 700 according to the third embodiment of the present invention.

FIG. 28 is a timing chart showing the operation of the decoding processing circuit 700.

At a time t0, the error correcting circuit 24 detects that receiving of data for a single packet is completed and activates the first interruption signal (high level). In the decoding processing circuit 700, the output of the RS flip-flop circuit 720 enters a set state (goes high) at a time t1 in response to the activation of the first interruption signal INTR1, so that a count value of the counter circuit 716 is reset.

In response to the setting of the output of the RS flip-flop circuit 720, the switching circuit 714 is switched to a state of receiving the output signal int.CLK of the clock circuit 712 and outputting the same as the operation control clock signal Cont.CLK. At a time t2, therefore, the switching circuit 714 starts to output the operation control clock signal Cont.CLK. The shift register 702 receives the input signal $D_{in}$ bitwise in response to the pulse of the operation clock signal Cont.CLK. At this time, the output of the logic gate circuit 706 keeps a low level since the output of the RS flip-flop circuit 720 is at a high level. Therefore, the input data $D_{in}$ is outputted from the exclusive OR circuit 708 as such, and inputted in the shift register 702.

The counter circuit 716 indicates the in-packet number of the newest single bit in the shift register 702. It is assumed that the counter circuit 716 performs a counting operation in a cycle of the data length of a single packet, i.e., 176 bits in this case.

The comparison circuit 718 outputs a high-level signal to the RS flip-flop circuit 720 at a point when the count value of the counter circuit 716 reaches 32, i.e., whole prefix in packet data is inputted in the shift register 702.

Therefore, the output of the RS flip-flop circuit 720 enters a reset state (low level) at a time t3.

On the other hand, the pseudo-random number generation circuit 704 receives parallel outputs from the shift register 702 and extracts a data group number and a data packet number for forming an initial value of random number generation on the basis of the same and master key data.

The timer circuit 110 starts a counting operation in response to inversion of the output of the RS flip-flop circuit 720 to a low level at a time t3, and outputs the interruption signal INTR2 to the CPU 40 and the pseudorandom number generation circuit 704 after a lapse of a prescribed delay time T (at a time t4). The random number generators 504 to 506 in the pseudo-random number generation circuit 704 start operations in response to the activation of the interruption signal INTR2.

The CPU 40 receives the second interruption signal INTR2, and starts outputting the external clock signal Ext-.CLK. The switching circuit 714 is switched to a state of receiving the external clock signal Ext.CLK and outputting the same as the operation control clock signal Cont.CLK in response to resetting of the output of the RS flip-flop circuit 720.

In response to the activation of the second interruption signal INTR2 at the time t4, therefore, the externally supplied external clock signal Ext.CLK is supplied to the shift register 702, the pseudo-random number generation circuit 704 and the error correcting circuit 24 as the operation control clock signal Cont.CLK at a time t5.

In response to toggling of the signal Cont.CLK, the input signal $D_{in}$ is inputted from the error correcting circuit 24 in the decoding processing circuit 700 bitwise.

The pseudo-random number generation circuit 704 also outputs a pseudo-random binary sequence in response to the signal Cont.CLK. At this time, the output of the RS flip-flop circuit 720 is at a low level, whereby the output of the pseudo-random number generation circuit 704 is outputted to the exclusive OR circuit 708 as such.

The exclusive OR circuit 708 performs an exclusive OR operation of data following the prefix, i.e., data block data and the output of the pseudo-random number generation circuit 704, i.e., decoding processing, and outputs the result to the shift register 702.

The shift register 702 is controlled by the operation control clock signal Cont.CLK which is identical to the external clock signal Ext.CLK from the CPU 40, and outputs the data to the CPU 40 bitwise.

When the error correcting circuit 24 detects completion of receiving of data for a single packet and outputs the first interruption signal INTR1, the operation control clock signal Cont.CLK is supplied to the error correcting circuit 24 by 32-bit data, i.e., prefix data due to the aforementioned operation, as viewed from the error correcting circuit 24. Thereafter the operation control clock signal Cont.CLK corresponding to 33rd to 176th bits, i.e., data block data, is supplied to the error correcting circuit 24 after a lapse of a prescribed time, so that data output for a single packet is completed. In this case, the output from the error correcting circuit 24 is controlled by the operation control clock signal Cont.CLK, and hence no interface for the error correcting circuit 24 may be changed.

On the other hand, the CPU 40 receives the second interruption signal INTR2 and outputs a clock signal for 176 bits, i.e., for a single packet, to the decoding processing circuit 700, thereby completing data input for a single packet as viewed from the CPU 40. As viewed from the CPU 40, therefore, data input can be performed in an interface structure which is absolutely identical to that in case of being provided with no decoding processing circuit 700.

In other words, it is possible to decode data outputted from the error correcting circuit 24 simply by connecting the decoding processing circuit 700 without changing the interface structures for the error correcting circuit 24 and the CPU 40, by employing the structure of this embodiment.

Further, the bit number of the shift register 702 can be reduced below that for a single packet, whereby a delay caused by passage of data through the shift register 702 can be suppressed to the minimum.

While only decoding of encoded data has been described as the operation of the decoding processing circuit 700 in the above, the structure of this embodiment of the present invention is not restricted to such an object alone, but the structure of this embodiment is applicable to an intermediate processor for processing other data included in packet data on the basis of prescribed data, as a matter of course.

[Fourth Embodiment]

Figure 29:
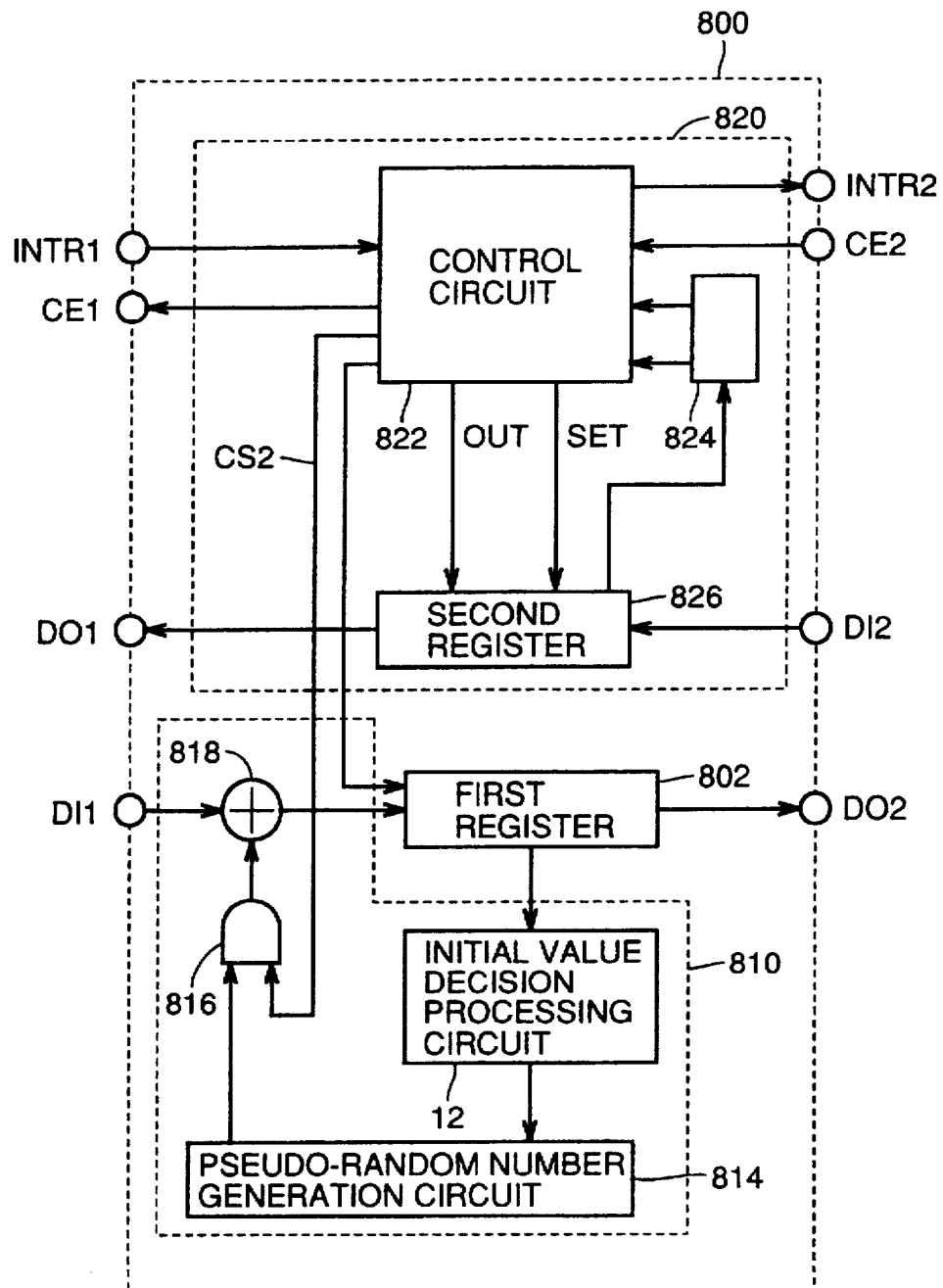
FIG. 29 is a schematic block diagram showing the structure of a decoding processing circuit 800 according to a fourth embodiment of the present invention.

FIG. 29 is a schematic block diagram showing still another exemplary structure of a decoding processing circuit 800 corresponding to the decoding processing circuit 400 in the FM multiplex broadcasting receiver 100 shown in FIG. 10.

The decoding processing circuit 800 is connected between the error correcting circuit 24 and the CPU 40 in the structure of the conventional FM multiplex broadcasting receiver shown in FIG. 2. Therefore, address signals B0 to B3 and A0 to A3 and control data DI0 to DI15 from the CPU 40 and demodulation data DI1 from the error correcting circuit 24 are inputted in the decoding processing circuit 800.

The decoding processing circuit 800 decodes the demodulation signal DI1 and thereafter outputs an output signal DO2 to the CPU 40 while outputting an output signal responsive to the address signals and the control data to the error correcting circuit 24.

It is assumed that the structure of packet data to be processed and a scramble system are identical to those described with reference to FIG. 26.

Therefore, not a single value but a value updated for every packet is employed as the key data, while randomized values are employed for master key data, a data packet number and a data group number, as described later.

The master key data is included in a prescribed position of a prescribed data packet for every group data and transmitted, for example.

Therefore, a constant delay time is present after the master key data is extracted in the decoding processing circuit 800 and until the key data is formed along with the data group number and the data packet number.

Referring to FIG. 29, the decoding processing circuit 800 according to this embodiment generally includes a first shift register 802, a data decoding processing circuit 810, and a control part 820.

The data decoding processing circuit 810 includes an initial value decision processing circuit 812 for receiving prescribed data from the first shift register 802 and forming an initial value, a pseudo-random number generation circuit 814 for receiving an output from the initial value decision processing circuit 812 and forming a pseudo-random binary sequence, an AND circuit 816 for receiving an output from the pseudo-random number generation circuit 814 and outputting the same while being controlled by a second operation control signal, and an exclusive OR circuit 818 for receiving the input data DI1 from the error correcting circuit 24 and performing an exclusive OR operation for outputting the result to the first shift register 802.

The control part 820 includes a control circuit 822, a second shift register 826 which is controlled by the control circuit 822 for receiving the address signals and the control data from the CPU 40, and a comparison circuit 824 for receiving the address signals inputted in the second shift register 826 in parallel and detecting whether an input mode or an output mode is specified.

[Operation of Decoding Processing Circuit in Output Mode]

An operation of the decoding processing circuit 800 receiving the demodulation data DI1 outputted from the error correcting circuit 24, decoding the same and thereafter outputting the result to the CPU 40 (serial data output mode) is now described.

While a clock signal must be supplied for controlling the operations of the shift registers 802 and 826 and the like in practice, such a clock signal is omitted in the following description for simplifying the illustration.

Figure 30:
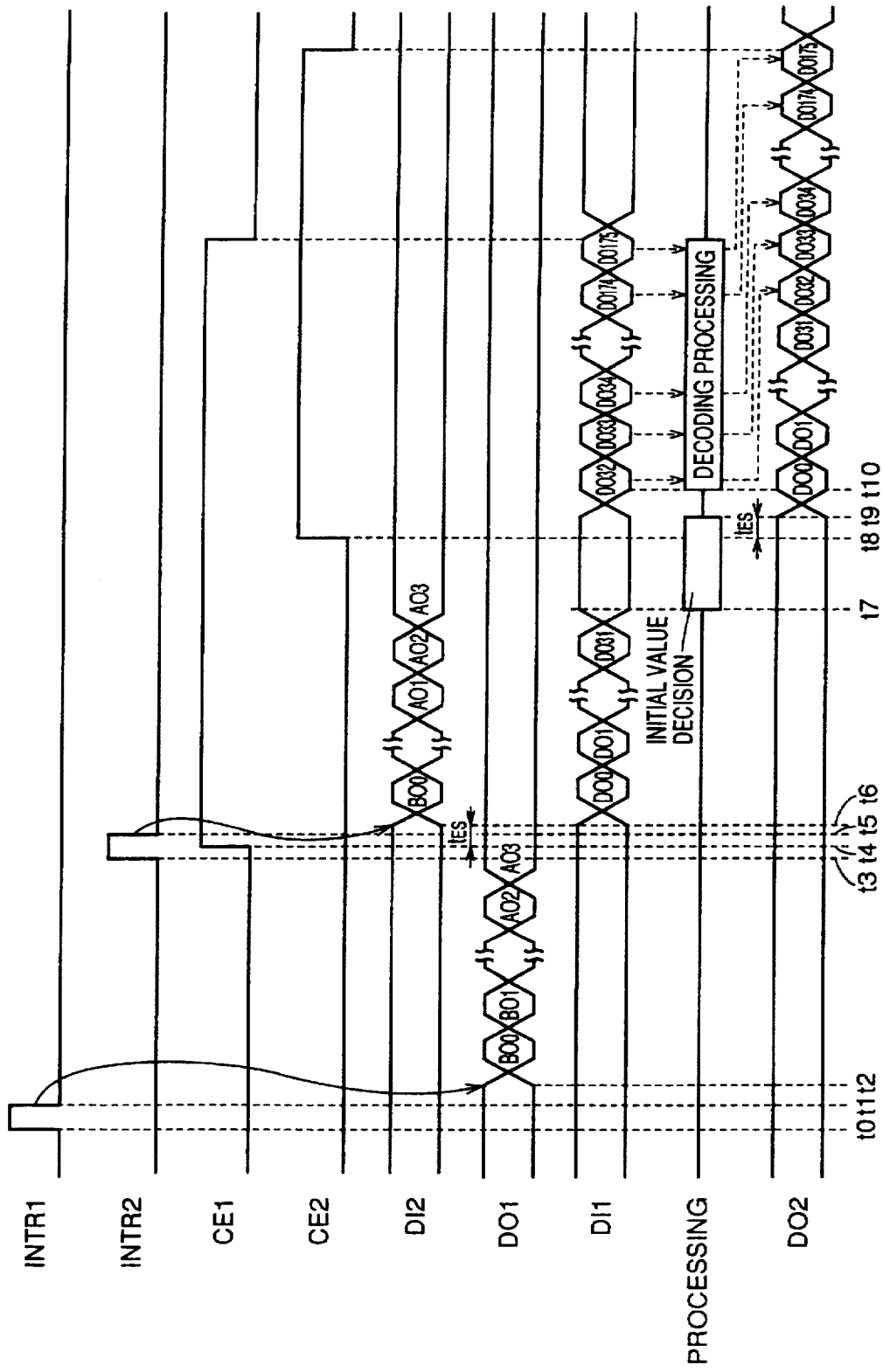
FIG. 30 is a timing chart showing the operation of the decoding processing circuit 800 according to the fourth embodiment of the present invention in a serial data output mode.

FIG. 30 is a timing chart showing the operation of the decoding processing circuit 800 in the serial data output mode.

Referring to FIGS. 29 and 30, the error correcting circuit 24 detects that modulation of data corresponding to a single packet is completed among receive data transmitted by FM multiplex broadcasting, and outputs a first pulse interruption signal INTR1 of a high level at a time t0.

The control circuit 822 detects the inversion of the interruption signal INTR1 to a high level, and outputs the address signals B0 to B3 and A0 to A3 specifying the output mode to the second shift register 826 in parallel.

At a time t2, the second shift register 826 is controlled by the control circuit 822 and starts to serially output the address signals.

When the second shift register 826 completes the output of the address signals at a time t4, the control circuit 822 inverts a signal CE1 from a low level to a high level. In response to this, the error correcting circuit 24 detects the completion of the address signal output, and detects that the address signals are the data B0 to B3 and A0 to A3 specifying the output mode.

The control circuit 822 controls the operation of the first shift register 802 by a first operation control signal CS1 at a time t6 after a lapse of a time $T_{ES}$ from the time t4 for inputting data (for 32 bits) corresponding to a prefix of packet data from the error correcting circuit 24 to the first shift register 802.

At this time, a signal CS2 is at a low level and hence an output of the AND circuit 816 is also at a low level, and the exclusive OR circuit 818 outputs the demodulation data DI1 to the first shift register 802 as such.

The first shift register 802 is not particularly restricted but a 32-bit shift register, for example, and successively receives packet data outputted from the error correcting circuit 24.

The initial value decision processing circuit 812 detects that the prefix of the packet data is inputted in the first shift register 802 at a time t7, receives parallel outputs from the first shift register 802, extracts the data group number and the data packet number, and starts formation of an initial value for generating a pseudo-random number on the basis of the master key data previously extracted by a key data fetch circuit (not shown), and completes the formation at a time t9.

On the other hand, the control circuit 822 outputs the second pulse interruption signal INTR2 to the CPU 40 after a lapse of a delay time required by the initial value decision processing circuit 812 for forming the initial value (time t3), for example, after the first interruption signal INTR1 is activated (high-level state).

In response to activation of the second interruption signal INTR2, the CPU 40 outputs the address signals B0 to B3 and A0 to A3 corresponding to the output mode after a lapse of a prescribed time, after fall of the interruption signal INTR2. The second shift register 826 receives these address signals, and the comparison circuit 824 receives parallel outputs from the second shift register 826 for detecting that the output mode is specified.

The control circuit 822 detects that the CPU 40 specifies the serial data output mode on the basis of a comparison result of the comparison circuit 824, and activates the second operation control signal CS2.

The pseudo-random number generation circuit 814 forms a pseudo-random binary sequence (e.g., an m sequence (maximum-length sequence)) on the basis of the initial value from the initial value decision processing circuit 812 in response to activation of the signal CS2.

The AND circuit 816 receives the output of the pseudo-random number generation circuit 814 and the signal CS2, and outputs the output of the pseudo-random number generation circuit 814 to the exclusive OR circuit 818 in a period when the signal CS2 is at a high level.

The exclusive OR circuit 818 exclusively ORs an output signal from the AND circuit 816 and the input signal DI1 from the error correcting circuit 24, thereby decoding the input signal DI1 and outputting the result to the first shift register 802.

The first shift register 802 successively serially receives the output from the exclusive OR circuit 818 bitwise at a time t10 in response to the activation of the second operation control signal CS2, and starts outputting to the CPU 40.

At this time, data DO0 to DO31 of the prefix part having already been inputted in the first shift register 802 are outputted to the CPU 40 as such and data DO32 to DO175 of a data block part following the prefix are successively decoded by the exclusive OR circuit 818 and thereafter outputted to the CPU 40.

The pseudo-random binary sequence outputted from the pseudo-random number generation circuit 814, which is generated by the same initial value and the same arithmetic processing employed for encoded in case of transmitting FM multiple broadcasting data, is identical to that in encrypting, and decoding processing is performed in accordance with the principle described with reference to FIGS. 3(a) to 4(b). When the error correcting circuit 24 detects completion of receiving of data for a single packet and outputs the first interruption signal INTR1, the error correcting circuit 24 first outputs 32-bit data, i.e., data for prefix data due to the aforementioned operation, as viewed from the error correcting circuit 24. Thereafter the error correcting circuit 24 outputs data corresponding to 33rd to 176th bits, i.e., data corresponding to data block data, among data for a single packet after a lapse of a prescribed time, so that data output for the single packet is completed. In this case, the error correcting circuit 24 is supplied with address signals BO0 to BO3 and AO0 to AO3 specifying the serial data output mode after activation of the first interruption signal INTR1 and successively outputs the data for a single packet bitwise, whereby no interface for the error correcting circuit 24 may be changed.

As viewed from the CPU 40, on the other hand, the CPU 40 receives the second interruption signal INTR2 and successively receives data for 176 bits, i.e., for a single packet, bitwise. Also as viewed from the CPU 40, therefore, data input can be performed in an interface structure which is absolutely identical to that in case of being provided with no decoding processing circuit 800.

When the comparison circuit 824 detects that the address signals B0 to B3 and A0 to A3 inputted in the second shift register 826 from the CPU 40 after activation of the second interruption signal INTR2 specify the serial data input mode in the above description, the control data from the CPU 40 are outputted to the error correcting circuit 24 through the second shift register 826, as described later.

[Operation of Decoding Processing Circuit in Input Mode]

An operation of the decoding processing circuit 800 in such a case that the CPU 40 specifies the serial data input mode and outputs the control data DI0 to DI15 to an FM multiplex broadcasting demodulation LSI including the error correcting circuit 24.

FIG. 31 is a timing chart showing the operation of the demodulation processing circuit 800 in the serial data input mode.

At a time t1, the CPU 40 starts outputting the address signals BI0 to BI3 and AI0 to AI3 specifying the serial data input mode.

In order to inform that output of the address signals from the CPU 40 is completed, a signal CE2 is inverted from a low level to a high level at a time t2.

The control circuit 822 receives a result of comparison of the address signals in the second shift register 826 and data specifying the serial data input mode by the comparison circuit 824, in response to the inversion of the signal CE2 to a high level.

The control circuit 822 detects that the address signals specify the serial data input mode, and starts outputting the data inputted in the second shift register 826 successively to the error correction circuit 24 as a signal DO1 at a time t3.

When the address signals are completely outputted from the second shift register 826, the control circuit 822 inverts the signal CE1 from a low level to a high level at a time t4, thereby informing the error correcting circuit 24 of the fact that output of the address data is completed.

On the other hand, the CPU 40 starts outputting the control data DI0 to DI15 after a lapse of a time $t_{ES}$ after inverting the signal CE2 to a high level at the time t2.

The second shift register 826 outputs the successively inputted control data DI0 to DI15 to the error correcting circuit 24 after a lapse of the time tES after the inversion of the signal CE1 to a high level.

Due to the aforementioned operation, the decoding processing circuit 800 outputs the address signals B0 to B3 and A0 to A3 as viewed from the error correcting circuit 24, and completion of this output is detected by the inversion of the signal CE1 to a high level. Further, output of the control data DI0 to DI15 is started after a lapse of a time TES after the inversion of the signal CE1 to a high level. Thus, input of the address signals and the control data in the error correcting circuit 24 is performed in an interface structure which is absolutely identical to that in case of being provided with no decoding processing circuit 800.

As viewed from the CPU 40, on the other hand, the CPU 40 outputs the control data DI0 to DI15 after a lapse of the time $t_{ES}$ after outputting the address signals B0 to B3 and A0 to A3 and indicating completion of the output by inverting the signal CE2 to a high level.

Also as viewed from the CPU 40, therefore, address data and control data can be outputted in an interface structure absolutely identical to that in case of being provided with no decoding processing circuit 800.

In other words, it is possible to decode data outputted from the error correcting circuit 24 and transmit the control data outputted from the CPU 40 to the error correcting circuit 24 simply by connecting the decoding processing circuit 800 without changing the interface structures for the error correcting circuit 24 and the CPU 40, by employing the structure of this embodiment.

Further, the bit number of the shift register 802 can be reduced below that for a single packet, whereby a delay caused by passage of data through the shift register 802 can be suppressed to the minimum.

While only decoding of encoded data has been described as the operation of the decoding processing circuit 800 in the above, the structure of this embodiment of the present invention is not restricted to such an object alone, but the structure of this embodiment is applicable to a decoding processor for processing other data included in packet data on the basis of prescribed data, as a matter of course.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital signal receiver for receiving transmit data, in a communication system for transmitting said transmit data comprising a plurality of packets each having a second prescribed bit length, each packet including encoded information data of a first prescribed bit length being divided into a plurality of blocks, each said packet including a plurality of specific data indicating the attributes of said packet and said encoded information data in first and second areas respectively, said digital signal receiver comprising:

demodulation means for receiving transmitted said transmit data and demodulating the same to a corresponding digital signal;

key data fetch means for receiving an output of said demodulation means and extracting master key data from a prescribed said packet among said plurality of packets including said encoded information data;

decoding processing means for performing decoding processing on said encoded information data for every corresponding said packet on the basis of at least one specific data being included in every said packet and said master key data; and data operation means for receiving an output of said decoding processing means and extracting said divided information data from said plurality of packets for structuring and outputting the same as said information data.

2. The digital signal receiver in accordance with claim 1, wherein said key data fetch means includes:

receive data storage means for successively serially receiving and serially outputting receive data and outputting storage data in parallel, key data position detection means for detecting whether or not said receive data is encoded for every said packet, activating an encoding detection signal if said receive data is encoded and detecting the position of said storage data in said receive data storage means in said receive data for activating a first bit position detection signal, and key data extract means for fetching first storage data including said key data from said receive data storage means in parallel in response to said activation of said encoding detection signal and said first bit position detection signal.

3. The digital signal receiver in accordance with claim 2, wherein the storage capacity of said receive data storage means is smaller than said second prescribed bit length.

4. The digital signal receiver in accordance with claim 3, wherein said transmit data includes:

encoding instruction data in a first prescribed position of said each packet while including said key data in a second prescribed position of said prescribed packet, said key data position detection means including:

bit counting means for counting the bit number of said receive data being inputted in said receive data storage means, first comparison means for receiving a count value of said bit counting means and activating a second bit position detection signal when said first prescribed position corresponds to said count value, encoding detection means for activating said encoding detection signal in response to said encoding instruction data in second storage data being received in parallel from said receive data storage means in response to said activation of said second bit position detection signal, and second comparison means for receiving said count value of said bit counting means for activating said first bit position detection signal when said second position of said prescribed packet corresponds to said count value.

5. The digital signal receiver in accordance with claim 4, wherein said key data extract means includes:

third comparison means for activating a key data identification signal in response to identification data in said first storage data, key data confirmation means for activating a key data fetch instruction signal in response to activation of said encoding detection signal, said first bit position detection signal and said key data identification signal, and key data storage means for receiving said key data in said first storage data in response to said key data fetch instruction signal.

6. The digital signal receiver in accordance with claim 1, wherein said key data fetch means includes:

receive data storage means for successively serially receiving and serially outputting receive data and outputting storage data in parallel, key data position detection means for detecting whether or not said receive data is encoded for every said packet, activating an encoding detection signal if said receive data is encoded and outputting key data packet indicating data being encoded from said prescribed packet as well as a packet number indicating signal and an in-packet position indicating signal corresponding to a packet number and an in-packet position to which said storage data in said receive data storage means belongs respectively, and key data extract means for receiving said encoding detection signal, said key data packet indicating data, said packet number indicating signal and said in-packet position indicating signal, and receiving first storage data including said key data being outputted from said receive data storage means in parallel in response to a result of comparison of said key data packet indicating data and said packet number indicating signal and a result of comparison of previously stored key data position data being specified in correspondence to said key data packet indicating data and said in-packet position indicating signal when said encoding detection signal is in an active state.

7. The digital signal receiver in accordance with claim 6, wherein the storage capacity of said receive data storage means is smaller than said second prescribed bit length.

8. The digital signal receiver in accordance with claim 7, wherein said transmit data includes encoding instruction data and packet number indicating data in first and second prescribed positions of said each packet respectively while including said key data packet indicating data in a third prescribed position of said prescribed packet, said key data position detection means including:

bit counting means for counting the bit number of said receive data being inputted in said receive data storage means in a cycle of said second prescribed bit length and outputting said in-packet position indicating signal, first comparison means for activating a first bit position detection signal when said in-packet position indicating signal corresponds to said first prescribed position, encoding detection means for activating an encoding detection signal in response to said encoding instruction data in second storage data being received from said receive data storage means in parallel in response to said activation of said first bit position detection signal, packet number detection means for outputting a packet number indicating signal in response to packet number indicating data in said second storage data, second comparison means for detecting said third prescribed position in response to said packet number indicating signal and said in-packet position indicating signal and activating a second bit position detection signal, and key data packet detection means for receiving said key data packet indicating data from said receive data storage means in response to said activation of said second bit position detection signal and outputting the same.

9. The digital signal receiver in accordance with claim 8, wherein said key data extract means includes:

a plurality of key data position comparison means for previously storing the position of said key data in a prescribed said packet being specified by said key data packet indicating data and activating a key data detection signal in response to a result of comparison with said in-packet position indicating signal, key data confirmation means for activating a key data fetch instruction signal in response to a result of comparison of said key data packet indicating data and said packet number indicating signal and said activation of said key data detection signal when said encoding detection signal is in an active state, and key data storage means for receiving said key data in said first storage data in response to said key data fetch instruction signal.

10. The digital signal receiver in accordance with claim 9, wherein said key data extract means further includes:

third comparison means for activating a key data identification signal in response to identification data in said first storage data, said key data confirmation means activating said key data fetch instruction signal in response to a result of comparison of said key data position indicating data and said packet number indicating signal, said activation of said key data detection signal and said activation of said key data identification signal when said encoding detection signal is in an active state.

11. The digital signal receiver in accordance with claim 1, wherein said decoding processing means includes:

receive data storage means for successively serially receiving and serially outputting receive data, and outputting storage data in parallel, decoding signal generation means for detecting that said first area is inputted in said receive data storage means for every said packet and generating a decoding signal on the basis of said specific data being included in said storage data being outputted in parallel, and logical operation means for receiving said receive data and said decoding signal and decoding said information data in said second area for every corresponding said packet.

12. The digital signal receiver in accordance with claim 11, wherein the storage capacity of said receive data storage means is smaller than said second prescribed bit length.

13. The digital signal receiver in accordance with claim 12, wherein said information data is encoded by an exclusive OR operation with a pseudo-random number sequence being generated on the basis of initial data being decided by said at least one specific data and said master key data.

said decoding signal generation means generates said pseudo-random number sequence on the basis of said initial data, and said logical operation means performs an exclusive OR operation of said information data in said second area and said pseudo-random number sequence for every corresponding said packet of said receive data.

14. The digital signal receiver in accordance with claim 13, wherein said decoding signal generation means includes:

bit counting means for counting the bit number of said receive data being inputted in said receive data storage means, first comparison means for receiving a count value of said bit counting means and activating a first bit position detection signal when said first area corresponds to said count value, initial data generation means for generating said initial data on the basis of said at least one specific data in said storage data being received from said receive data storage means in parallel in response to said activation of said first bit position detection signal, and second comparison means for receiving said count value of said bit counting means and activating a second bit position detection signal when said second area corresponds to said count value, and first pseudo-random number sequence generation means for generating said pseudo-random number sequence on the basis of said initial data in response to said activation of said second bit position detection signal.

15. The digital signal receiver in accordance with claim 14, wherein said transmit data has information data encoded on the basis of master key data and said at least one specific data for every said each block in at least partial ones among said plurality of packets forming the transmit data and includes said master key data in a prescribed one of said at least partial packets, said initial data generation means including:

second pseudo-random number sequence generation means for generating a pseudo-random number on the basis of said at least one specific data, and arithmetic means for generating said initial data on the basis of an output of said second pseudo-random number sequence generation means and said master key data being extracted from said receive data.

16. The digital signal receiver in accordance with claim 15, wherein said first pseudo-random number sequence generation means includes:

a plurality of pseudo-random number generators for generating pseudo-random number sequences on the basis of said initial data, and nonlinear arithmetic means for receiving outputs of said plurality of pseudo-random number generators and performing a nonlinear operation for outputting said pseudo-random number sequences.

17. The digital signal receiver in accordance with claim 1, wherein said demodulation means and said data operation means are controlled by an operation control clock signal being generated in response to activation of a first trigger signal from said demodulation means side, said decoding processing means including:

data processing means whose input operation of digital data is controlled by said operation control clock signal for performing initial data decision processing on the basis of digital data from said demodulation means and performing decoding processing on the basis of decided initial data and outputting the result to said data operation means side, internal clock generation means for outputting an internal clock signal, and clock signal output means for outputting said internal clock signal as said operation control clock signal in a period when said digital data from said demodulation means is inputted by a prescribed number of bits in response to said activation of said first trigger signal, outputting a second trigger signal being responsive to said first trigger signal after a lapse of said initial value decision processing period, receiving an external clock signal being outputted from said data operation means side in response to activation of said second trigger signal, and outputting the same as said operation control clock signal in said decoding processing period.

18. The digital signal receiver in accordance with claim 17, wherein said clock signal output means includes:

timing detection means for detecting a start of said initial data decision processing of said data processing means and activating a timing detection signal, counting means for starting counting in response to said activation of said timing detection means and outputting said second trigger signal after a lapse of a prescribed waiting time, and switching means for switching a first state of receiving said internal clock signal and outputting the same as said operation control clock signal and a second state of receiving said external clock signal and outputting the same as said operation control clock signal, said switching means holding said first state in a period when said digital data from said demodulation means is inputted by said prescribed number of bits in response to said activation of said first trigger signal, and holding said second state in a period when said external clock signal is outputted in response to said second trigger signal.

19. The digital signal receiver in accordance with claim 1, wherein either one of an output mode for outputting data comprising of said plurality of packets each having said second prescribed bit length from said demodulation means to said data operation means and an input mode of inputting data from said data operation means by said demodulation means is specified in response to operation mode specifying data being supplied to said demodulation means, and said decoding processing means includes:

control means, said control means (i) detecting that output preparation for said packets is completed in said demodulation means and outputting said operation mode specifying data specifying said output mode to said demodulation means for activating a first operation control signal, (ii) activating a second operation control signal when said operation mode specifying data being outputted from said data operation means specifies said output mode, and (iii) outputting said operation mode specifying data for specifying said input mode to said demodulation means and outputting data from said data operation means to said demodulation means as such when said operation mode specifying data being outputted from said data operation means specifies said input mode, said decoding means further including:

data storage means for inputting data of a third prescribed bit length among said packets in response to said activation of said first operation control signal, successively serially receiving and serially outputting said packet data in response to said activation of said second operation control signal, and outputting storage data in parallel, and data processing means for performing said prescribed decoding processing on said packet data being successively inputted in said data storage means on the basis of initial data being decided in response to said data of said third prescribed bit length being received from said data storage means in parallel.

20. The digital signal receiver in accordance with claim 19, wherein the storage capacity of said data storage means is smaller than said second prescribed bit length.

* * * * *